United States Patent
Ashby et al.

(10) Patent No.: US 9,367,720 B2
(45) Date of Patent: Jun. 14, 2016

(54) BARCODE READER WHICH OBTAINS A RAM IMAGE FROM A REMOTE SERVER

(71) Applicant: The Code Corporation, Draper, UT (US)

(72) Inventors: Mark Ashby, Taylorsville, UT (US); George Powell, Draper, UT (US); Ryan Hoobler, Salt Lake City, UT (US); Ming Lei, Princeton Junction, NJ (US); Steve Pierce, West Jordan, UT (US)

(73) Assignee: The Code Corporation, Draper, UT (US)

( * ) Notice: Subject to any disclaimer, the term of this patent is extended or adjusted under 35 U.S.C. 154(b) by 93 days.

(21) Appl. No.: 14/317,399

(22) Filed: Jun. 27, 2014

(65) Prior Publication Data

US 2015/0363624 A1  Dec. 17, 2015

Related U.S. Application Data

(63) Continuation of application No. 14/304,794, filed on Jun. 13, 2014.

(51) Int. Cl.
*G06F 9/445* (2006.01)
*G06F 9/44* (2006.01)
*G06K 7/10* (2006.01)

(52) U.S. Cl.
CPC .............. *G06K 7/10821* (2013.01); *G06F 8/60* (2013.01); *G06F 9/445* (2013.01); *G06F 9/4416* (2013.01); *G06F 9/44505* (2013.01); *G06F 9/44557* (2013.01); *G06F 9/44568* (2013.01); *G06K 7/10722* (2013.01)

(58) Field of Classification Search
CPC .............. G06F 9/44505; G06F 9/4416; G06K 7/10821
USPC .................................................. 235/462.25
See application file for complete search history.

(56) References Cited

U.S. PATENT DOCUMENTS

| | | | | | |
|---|---|---|---|---|---|
| 651,919 | A | * | 6/1900 | Cockrell | D01B 1/04 19/40 |
| 5,185,514 | A | * | 2/1993 | Wike, Jr. | G06K 1/128 235/375 |
| 5,493,213 | A | * | 2/1996 | Collins, Jr. | G06K 7/10851 235/438 |
| 5,723,853 | A | * | 3/1998 | Longacre, Jr. | G06K 7/10851 235/462.07 |
| 5,905,249 | A | * | 5/1999 | Reddersen | G06F 1/18 235/462.13 |
| 7,093,760 | B1 | * | 8/2006 | Collins, Jr. | G06K 17/0022 235/462.01 |
| 2002/0185540 | A1 | * | 12/2002 | Hashimoto | G06K 7/10851 235/462.25 |
| 2004/0016812 | A1 | * | 1/2004 | Schmidt | B82Y 15/00 235/462.31 |
| 2004/0206821 | A1 | * | 10/2004 | Longacre, Jr. | G06K 7/10851 235/462.07 |

(Continued)

*Primary Examiner* — Toan Ly
(74) *Attorney, Agent, or Firm* — Timothy P. O'Hagan; Austin Rapp & Hardman

(57) ABSTRACT

A host device is configured to (i) establish a point-to-point connection with a barcode reader via a point-to-point communication interface, (ii) determine that the barcode reader is in a state wherein executable instructions necessary for providing decoded data to the host device are not present within memory of the barcode reader, (iii) use the network interface to connect to a configuration server and to receive, from the configuration server, executable instructions required for the barcode reader to be capable of providing the decoded data to the host device, (iv) provide the executable instructions to the barcode reader via the point-to-point connection, and (v) receive from the barcode reader, via the point-to-point communication interface, the decoded data only after the executable instructions have been loaded to volatile memory of the barcode reader.

24 Claims, 15 Drawing Sheets

(56) References Cited

U.S. PATENT DOCUMENTS

| | | | |
|---|---|---|---|
| 2005/0132351 A1* | 6/2005 | Randall | G06F 11/1433 717/168 |
| 2005/0141025 A1* | 6/2005 | Hanada | G06F 8/65 358/1.15 |
| 2005/0216904 A1* | 9/2005 | Needham | G06F 8/67 717/168 |
| 2006/0208083 A1* | 9/2006 | Kotlarsky | G06K 7/10881 235/462.01 |
| 2008/0203167 A1* | 8/2008 | Soule | G06F 8/63 235/462.01 |

* cited by examiner

BARCODE READER WHICH OBTAINS A RAM IMAGE FROM A REMOTE SERVER

CLAIM OF PRIORITY

This application is a continuation of U.S. patent application Ser. No. 14/304,794, titled "Providing Operating Instructions For A Barcode Reader From A Server," filed Jun. 13, 2014, with inventors Mark Ashby, George Powell, Ryan Hoobler, Ming Lei and Steve Pierce.

TECHNICAL FIELD

The present disclosure relates generally to barcode readers. More specifically, the present disclosure relates to providing operating instructions for a barcode reader from a server.

BACKGROUND

Known barcode readers include firmware stored in non-volatile memory which, upon power-up is loaded to volatile memory (RAM) as executable code. A processor executes the executable code from RAM for operating the barcode reader. The firmware may include an operating system (e.g., Linux®), drivers for the hardware components such as the image sensor array and communication hardware, a decoder, and formatting/routing instructions (i.e., instructions for parsing, formatting, and routing decoded data) (collectively, referred to as operating instructions).

In a first known configuration, the firmware stored in non-volatile memory includes the components of the operating instructions, at least some of which include position independent code. In this configuration each component of the firmware may be loaded to RAM at address space determined by a hardware or software virtual memory manager such that, once loaded to RAM, the instructions can be executed by a processor in combination with the hardware or software memory manager.

In a second known configuration, the firmware stored in the non-volatile memory may include a RAM image. The RAM image includes all portions of the operating instructions compiled as a unified block of machine code instructions which is loaded within predetermined physical address space such that internal address links align with physical address locations within the RAM and the unified block of machine code instructions may be executed without use of a memory manager for address translation.

In either known configuration, part of the firmware may include a remote upgrade system. The remote upgrade system may be part of the executable code and it enables upgrade of the firmware.

In more detail, known remote upgrade systems will obtain an upgrade file and store the upgrade file in storage. In the first configuration the upgrade file may be a .zip or similar file which includes multiple files which are intended to replace the multiple files of the then existing firmware. In this configuration the upgrade system writes each new file to non-volatile memory in replacement of an existing file.

In the second configuration the upgrade file may simply be a binary object which is intended to replace the unified block of machine code instructions. In this configuration the upgrade system writes the binary object to non-volatile memory in replacement of the existing unified block of machine code instructions.

In either configuration, when writing the new file(s) to non-volatile memory is complete, the unit undergoes a re-boot which loads the new file(s) from non-volatile memory to the RAM for execution —with the effect being that the new file(s) replace the old files within the RAM.

There are at least two problems with these known configurations. First, flash memory is expensive and writing to flash memory is slow. Second, updating any of the firmware, decoder, formatting/routing instructions, and other executable code requires re-flashing the reader. This can be a logistical problem in an environment with many readers that should have the same version of the firmware, decoder, formatting/routing instructions, etc.

SUMMARY

A barcode reader may include one or more advancements in the manner in which its software and/or firmware are updated and/or installed. The barcode reader may have various hardware components such as an illumination system, an imaging system, an input control linked to one or more user input devices, a display, a wireless LAN interface, and/or a point-to-point interface. These hardware components may be connected to a system package via hardware circuits. The system package may also have a processor, volatile memory, and non-volatile memory.

The non-volatile memory of the reader may store an ID parameter to be transmitted to a configuration server, the address of the configuration server (or a redirect server that can provide the address of the configuration server or another redirect server), and optionally, various executable files such as an operating system and a boot sequence. The boot sequence may contain fetch instructions and/or communication control instructions that enable the reader to transmit the ID parameter to the configuration server and receive the operating instructions.

The barcode reader may receive operating instructions selected from multiple versions of the operating instructions stored on a configuration server remote from the barcode reader. The proper version of the operating instructions may be determined based on the ID parameter transmitted to the configuration server by the barcode reader. Each version of the operating instructions may be associated with one or more ID parameters so that the proper version of the operating instructions is transmitted to the reader. The various versions of the operating instructions may be designed to satisfy different hardware, decoding, routing, and/or formatting requirements applicable to readers in a variety of circumstances.

The executable code may be loaded directly into the volatile memory, without first being loaded into the non-volatile memory. This may be done by obtaining the operating instructions as a RAM image that can be copied directly into the volatile memory. This may help to enhance the security of the reader by ensuring that the operating instructions received from the configuration server are the operating instructions used by the reader, and may further expedite the process of preparing the reader for use.

The operating instructions may be loaded at a location in the volatile memory that begins at a start address identified or stored in the non-volatile memory or in a header of the operating instructions. This may enable proper operation of the operating instructions in a position-dependent memory environment.

In some embodiments, where the reader has a virtual memory manager or other component capable of supporting position-independent memory allocation, no such address need be provided. The physical location of the operating instructions within the volatile memory may be determined by the virtual memory manager.

Optionally, the operating instructions may be executed directly after they have been loaded in the volatile memory, without requiring the reader to be rebooted, powered off, and/or powered on. As another option, an operating system for the reader may be stored in the operating instructions received from the configuration server. The reader may be unable to scan barcodes and/or carry out other computing tasks until the operating instructions have been received, loaded into the volatile memory, and executed. These options may provide further enhancements to the security of the reader.

According to one aspect of the invention, there is provided a barcode reader for providing decoded data to a remote computing system. The barcode reader may include an image sensor for capturing an image of a barcode within a field of view, a communication interface, volatile memory, non-volatile memory including an identification parameter and first executable code, and a processor. The processor may be configured to execute the first executable code to utilize the communication interface to provide the identification parameter to a configuration server and receive second executable code from the configuration server. The second executable code may include instructions for formatting and routing the decoded data. The second executable code may be selected from multiple distinct versions of second executable code based on the identification parameter. The processor may further be configured to load the second executable code to the volatile memory and execute the second executable code to format the decoded data and route the formatted decoded data to the remote computing system.

Alternatively or additionally, the barcode reader may receive the second executable code from the configuration server and execute the second executable code without rebooting.

Alternatively or additionally, the barcode reader may execute the first executable code in response to a configuration event.

Alternatively or additionally, the second executable code may be selected from the multiple distinct versions of the second executable code based on requirements for formatting the decoded data. The requirements may be associated with the identification parameter.

Alternatively or additionally, the second executable code may be selected from the multiple distinct versions of the second executable code based on requirements for routing the decoded data. The requirements may be associated with the identification parameter.

Alternatively or additionally, the barcode reader further may include illumination elements for illuminating the field of view. The non-volatile memory may further include instructions for driving the illumination elements to illuminate the field of view and for driving the image sensor to capture the image of the barcode within the field of view.

Alternatively or additionally, the non-volatile memory may further include an address of the configuration server.

Alternatively or additionally, the non-volatile memory may further include an address of a redirect server. The processor may execute the first executable code to provide the identification parameter to the redirect server and receive an address of the configuration server from the redirect server.

According to one aspect of the invention, there is provided a barcode reader for providing decoded data to a remote computing system. The barcode reader may include a communication interface, volatile memory, non-volatile memory including first executable code, and a processor. The processor may be configured to execute the first executable code to utilize the communication interface to receive second executable code from a configuration server. The second executable code may include instructions for formatting and routing the decoded data. The processor may further be configured to load the second executable code directly to the volatile memory without the second executable code being loaded into the non-volatile memory, and execute the second executable code to format the decoded data and route the formatted decoded data to the remote computing system.

Alternatively or additionally, the barcode reader is not rebooted between (i) receiving the second executable code from the configuration server, and (ii) executing the second executable code.

Alternatively or additionally, the processor is also configured to detect the occurrence of a configuration event from a set of defined configuration events, and execute the first executable code in response to detecting the configuration event.

Alternatively or additionally, the non-volatile memory may further include an identification parameter. The processor, executing the first executable code, may further utilize the communication interface to transfer the identification parameter to the configuration server. The second executable code may be selected from multiple distinct versions of second executable code based on the identification parameter.

Alternatively or additionally, the second executable code may be selected from the multiple distinct versions of the second executable code based on at least one of: (i) requirements for formatting the decoded data that are associated with the identification parameter, and (ii) requirements for routing the decoded data that are associated with the identification parameter.

Alternatively or additionally, the barcode reader may further have illumination elements for illuminating a field of view and an image sensor for capturing an image of a barcode within the field of view. The non-volatile memory may further include instructions for driving the illumination elements to illuminate the field of view and for driving the image sensor to capture the image of the barcode within the field of view.

Alternatively or additionally, the non-volatile memory may further include an identification parameter and an address of the configuration server. The processor may execute the first executable code to utilize the address of the configuration server to establish a connection with the configuration server, transfer the identification parameter to the configuration server, and receive the second executable code from the configuration server.

Alternatively or additionally, the non-volatile memory may further include an identification parameter and an address of a redirect server. The processor may execute the first executable code to utilize the address of the redirect server to establish a connection with the redirect server, provide the identification parameter to the redirect server, receive an address of the configuration server from the redirect server, utilize the address of the configuration server to establish a connection with the configuration server, provide the identification parameter to the configuration server, and receive the second executable code from the configuration server.

According to one aspect of the invention, there is provided a barcode reader for providing decoded data to a remote computing system. The barcode reader may include a communication interface, volatile memory, non-volatile memory including an identification parameter, a boot sequence and a start address, and a processor. The processor may be configured to execute the boot sequence to provide the identification parameter to a configuration server and receive executable code from the configuration server based on the identification parameter, load the executable code to the volatile memory at a location that begins at the start address, and execute the executable code.

Alternatively or additionally, the start address may align with addresses that are referenced internally in the executable code such that the executable code is executable immediately upon being loaded to the volatile memory at the location that begins at the start address.

Alternatively or additionally, after the barcode reader is powered up, the barcode reader may be incapable of providing the decoded data to the remote computing system prior to executing the executable code received from the configuration server.

Alternatively or additionally, the barcode reader may not be rebooted between (i) receiving the executable code from the configuration server, and (ii) executing the executable code.

Alternatively or additionally, the barcode reader may further include an image sensor for capturing an image of a barcode within a field of view. The executable code may include instructions necessary to drive the image sensor to capture the image.

Alternatively or additionally, the barcode reader may further include an image sensor for capturing an image of a barcode within a field of view. The executable code may include a decoder, which may be instructions executed by the processor to obtain the decoded data from the image of the barcode captured by the image sensor.

Alternatively or additionally, the executable code may include instructions for formatting the decoded data and routing the decoded data to the remote computing system.

Alternatively or additionally, the executable code may be selected from multiple distinct versions of executable code based on the identification parameter.

Alternatively or additionally, the executable code may be selected from the multiple distinct versions of the executable code based on requirements for specific decoder functions that are associated with the identification parameter.

Alternatively or additionally, the executable code may be selected from the multiple distinct versions of the executable code based on requirements for formatting the decoded data that are associated with the identification parameter.

According to one aspect of the invention, there is provided a barcode reader for providing decoded data to a remote computing system. The barcode reader may include a communication interface, volatile memory, non-volatile memory including an identification parameter and a boot sequence, and a processor. The processor may be configured to execute the boot sequence to provide the identification parameter to a configuration server and receive executable code from the configuration server based on the identification parameter. The executable code may include a header that indicates a start address for the executable code. The processor may further be configured to load the executable code to the volatile memory at a first location that begins at a first address different than the start address, determine the start address for the executable code by reading the header within the executable code, and load the executable code to a second location within the volatile memory. The second location may begin at the start address. The processor may further be configured to execute the executable code.

Alternatively or additionally, the first address may not align with addresses that are referenced internally in the executable code such that the executable code is not executable upon being loaded to the volatile memory at the first location that begins at the first address. The start address may align with the addresses that are referenced internally in the executable code such that the executable code is executable immediately upon being loaded to the volatile memory at the second location that begins at the start address.

Alternatively or additionally, the barcode reader may be incapable of providing the decoded data to the remote computing system after power-up of the barcode reader and prior to executing the executable code received from the configuration server.

Alternatively or additionally, the executable code may include an operating system of the barcode reader. The barcode reader may not be able to read a barcode until the processor executes the executable code.

Alternatively or additionally, the barcode reader may not be rebooted between (i) receiving the executable code from the configuration server, and (ii) executing the executable code.

Alternatively or additionally, the barcode reader may further include an image sensor for capturing an image of a barcode within a field of view. The executable code may further include instructions necessary to drive the image sensor to capture the image.

Alternatively or additionally, the barcode reader may further include an image sensor for capturing an image of a barcode within a field of view. The executable code may include a decoder, which may be instructions executed by the processor to obtain the decoded data from the image of the barcode captured by the image sensor.

Alternatively or additionally, the executable code may include instructions for formatting the decoded data and routing the decoded data to the remote computing system.

Alternatively or additionally, the executable code may be selected from multiple distinct versions of executable code based on the identification parameter.

Alternatively or additionally, the executable code may be selected from the multiple distinct versions of executable code based on requirements for specific decoder functions that are associated with the identification parameter.

Alternatively or additionally, the executable code may be selected from the multiple distinct versions of the executable code based on requirements for formatting the decoded data that are associated with the identification parameter.

According to one aspect of the invention, there is provided a barcode reader for providing decoded data to a remote computing system. The barcode reader may include a communication interface, volatile memory, non-volatile memory including a boot sequence, and a processor. The processor may be configured to execute the boot sequence to utilize the communication interface to receive executable code from a configuration server, load the executable code to the volatile memory, and execute the executable code to commence operation of the barcode reader.

Alternatively or additionally, the barcode reader may execute the boot sequence in response to the barcode reader being powered up.

Alternatively or additionally, after the barcode reader is powered up, the barcode reader may be incapable of providing the decoded data to the remote computing system prior to the barcode reader executing the executable code received from the configuration server.

Alternatively or additionally, the non-volatile memory may not include an operating system for the barcode reader. The executable code may include the operating system for the barcode reader.

Alternatively or additionally, the barcode reader may not be rebooted between (i) receiving the executable code from the configuration server, and (ii) executing the executable code.

Alternatively or additionally, addresses specified within the executable code may be based on a reference address. The non-volatile memory may further include a virtual memory manager. The processor may be configured to execute the virtual memory manager to (i) determine an offset between the reference address and a memory address at which the beginning of the executable code is located, and (ii) apply the offset to each address specified within the executable code.

Alternatively or additionally, the executable code may be loaded to a location in the volatile memory that begins with a start address. The start address may align with addresses that are referenced internally in the executable code such that the executable code is executable immediately upon being loaded to the volatile memory.

Alternatively or additionally, the barcode reader may further include an image sensor for capturing an image of a barcode within a field of view. The executable code may include instructions necessary to drive the image sensor to capture the image.

Alternatively or additionally, the barcode reader may further include illumination elements for illuminating a field of view. The executable code may include instructions necessary to drive the illumination elements to illuminate the field of view.

Alternatively or additionally, the barcode reader may further include an image sensor for capturing an image of a barcode within a field of view. The executable code may include a decoder, which may be instructions executed by the processor to obtain the decoded data from the image of the barcode captured by the image sensor.

Alternatively or additionally, the executable code may include instructions for formatting the decoded data and routing the decoded data to the remote computing system.

Alternatively or additionally, the non-volatile memory may further include an identification parameter. The processor, executing the boot sequence, may further utilize the communication interface to transfer the identification parameter to the configuration server. The executable code may be selected from multiple distinct versions of executable code based on the identification parameter.

According to one aspect of the invention, there is provided a barcode reader for providing decoded data to a remote computing system. The barcode reader may have a communication interface, non-volatile memory including first executable code, volatile memory, and a processor. The processor may carry out steps including executing the first executable code to utilize the communication interface to obtain second executable code from a configuration server, loading the second executable code directly to the volatile memory, and executing the second executable code to commence operation of the barcode reader.

Alternatively or additionally, the barcode reader may be incapable of providing decoded data to the remote computing system after power-up of the barcode reader and prior to executing the second executable code obtained from the configuration server to commence operation of the barcode reader.

Alternatively or additionally, the non-volatile memory may be smaller than the size of a combination of the first executable code and the second executable code.

Alternatively or additionally, the non-volatile memory further includes a boot sequence. The processor may further execute the boot sequence directly from non-volatile memory to initiate communication between the processor and the volatile memory before executing the first executable code. The processor may execute the second executable code to commence operation of the barcode reader without the processor being required to re-execute the boot sequence.

Alternatively or additionally, the processor may further detect the occurrence of a configuration event from a set of defined configuration events, and utilize the communication interface to obtain second executable code from a configuration server in response to detecting the configuration event.

Alternatively or additionally, the processor, executing the first executable code, may further provide an identification parameter to the configuration server. The second executable code may be selected from multiple distinct versions of second executable code based on operating requirements of the reader which are associated with the identification parameter. The second executable code may include instructions for formatting decoded data for output to the remote computing system.

Alternatively or additionally, the barcode reader may further have an image sensor for capturing an image of a barcode within a field of view. The second executable code may include a decoder, which may be instructions executed by the processor to obtain decoded data from an image of a barcode captured by the image sensor.

Alternatively or additionally, the second executable code may further include instructions necessary to drive the image sensor to capture an image of a barcode within a field of view.

Alternatively or additionally, the non-volatile memory may further have an identification parameter. The processor, executing the first executable code, may further utilize the communication interface to transfer the identification parameter to the configuration server. The second executable code may be selected from multiple distinct versions of second executable code based on the identification parameter.

Alternatively or additionally, the second executable code may have instructions for formatting decoded data for output to the remote computing system. The second executable code may be selected from multiple distinct versions of second executable code based on requirements for formatting decoded data which are associated with the identification parameter.

Alternatively or additionally, the barcode reader may further have an image sensor for capturing an image of a barcode within a field of view. The second executable code may include a decoder, which may be instructions executed by the processor to obtain decoded data from an image of a barcode captured by the image sensor. The second executable code may be selected from multiple distinct versions of second executable code based on requirements for decoding data from barcodes of certain formats associated with the identification parameter.

Alternatively or additionally, the second executable code may further include instructions necessary to drive the image sensor to capture an image of a barcode within a field of view. The second executable code may be selected from multiple distinct versions of second executable code based on requirements for driving the image sensor associated with the identification parameter.

According to one aspect of the invention, there is provided a barcode reader for providing decoded data to a remote computing system. The barcode reader may have an image sensor configured to capture an image of a barcode within a field of view, non-volatile memory with first executable code, volatile memory, a communication interface, and a processor. The processor may commence operation of the barcode reader by loading the first executable code from non-volatile memory to volatile memory for execution, executing the first executable code to obtain second executable code from a remote configuration server via the communication interface and load the second executable code to volatile memory for execution, and executing a combination of both the first executable code and the second executable code to operate the barcode reader and provide decoded data to the remote computing system via the communication interface.

Alternatively or additionally, the barcode reader may be incapable of providing decoded data to the remote computing system after power-up of the barcode reader and prior to executing the second executable code obtained from the configuration server to commence operation of the barcode reader.

Alternatively or additionally, the non-volatile memory may be smaller than the size of a combination of the first executable code and the second executable code.

Alternatively or additionally, the non-volatile memory may further have a boot sequence. The processor may further execute the boot sequence directly from non-volatile memory to initiate communication between the processor and the volatile memory before executing the first executable code. The processor may execute the second executable code to commence operation of the barcode reader without the processor being required to re-execute the boot sequence.

Alternatively or additionally, the processor may further detect the occurrence of a configuration event from a set of defined configuration events. The processor may further utilize the communication interface to obtain second executable code from a configuration server in response to detecting the configuration event.

Alternatively or additionally, the processor, executing the first executable code, may further provide an identification parameter to the configuration server. The second executable code may be selected from multiple distinct versions of second executable code being selected based on operating requirements of the reader which are associated with the identification parameter. The second executable code may have instructions for formatting decoded data for output to the remote computing system.

Alternatively or additionally, the barcode reader may have an image sensor for capturing an image of a barcode within a field of view. The second executable code may include a decoder, which may be instructions executed by the processor to obtain decoded data from an image of a barcode captured by the image sensor.

Alternatively or additionally, the second executable code may further include instructions necessary to drive the image sensor to capture an image of a barcode within a field of view.

Alternatively or additionally, the non-volatile memory may further have an identification parameter. The processor, executing the first executable code, may further utilize the communication interface to transfer the identification parameter to the configuration server. The second executable code may be selected from multiple distinct versions of second executable code based on the identification parameter. The second executable code may be selected from multiple distinct versions of second executable code based on requirements for decoding data from barcodes of certain formats associated with the identification parameter Alternatively or additionally, the second executable code may have instructions for formatting decoded data for output to the remote computing system. The second executable code may be selected from multiple distinct versions of second executable code based on requirements for formatting decoded data which are associated with the identification parameter.

Alternatively or additionally, the barcode reader may further include an image sensor for capturing an image of a barcode within a field of view. The second executable code may include a decoder, which may be instructions executed by the processor to obtain decoded data from an image of a barcode captured by the image sensor. The second executable code may be selected from multiple distinct versions of second executable code based on requirements for decoding data from barcodes of certain formats associated with the identification parameter.

Alternatively or additionally, the second executable code may further include instructions necessary to drive the image sensor to capture an image of a barcode within a field of view. The second executable code may be selected from multiple distinct versions of second executable code based on requirements for driving the image sensor associated with the identification parameter.

According to one aspect of the invention, there is provided a barcode reader for providing decoded data to a remote computing system. The barcode reader may have barcode reading hardware, which may include an image sensor and a processor which captures an image of a barcode within a field of view and provides decoded data from the barcode to a remote computing system only when the processor executes operating instructions for the barcode reading hardware which the processor obtains from a remote configuration server upon power up of the barcode reader.

Alternatively or additionally, the barcode reader may further include a volatile and/or non-volatile memory storing the operating instructions obtained from the remote configuration server so long as the volatile memory remains in a refresh state. All instances of the operating instructions on the reader may be decimated with no instances remaining on the reader when the volatile memory resets or fails to refresh.

Alternatively or additionally, the barcode reader may further have a non-volatile memory with first executable code. The processor may further execute the first executable code to drive a communication interface to obtain the operating instructions from the remote configuration server.

Alternatively or additionally, the processor, executing the first executable code, may further provide an identification parameter to the configuration server. The operating instructions may be selected from multiple distinct versions of operating instructions based on operating requirements of the reader which are associated with the identification parameter. The second executable code may include instructions for formatting decoded data for output to the remote computing system.

Alternatively or additionally, the operating instructions may further include a decoder, which may be instructions executed by the processor to obtain decoded data from an image of a barcode captured by the image sensor. The operating instructions may be selected from multiple distinct versions of operating instructions based on requirements for decoding data from barcodes of certain formats associated with the identification parameter.

Alternatively or additionally, the operating instructions may further include instructions necessary to drive the image sensor to capture an image of a barcode within a field of view. The operating instructions maybe selected from multiple distinct versions of operating instructions based on requirements for driving the image sensor associated with the identification parameter.

Alternatively or additionally, the non-volatile memory may further have an identification parameter. The processor, executing the first executable code, may further utilize the communication interface to transfer the identification parameter to the configuration server. The operating instructions may be selected from multiple distinct versions of operating instructions based on the identification parameter.

Alternatively or additionally, the operating instructions may include instructions for formatting decoded data for output to the remote computing system. The operating instructions may be selected from multiple distinct versions of operating instructions based on requirements for formatting decoded data which are associated with the identification parameter.

Alternatively or additionally, the operating instructions may include a decoder, which may be instructions executed by the processor to obtain decoded data from an image of a barcode captured by the image sensor. The operating instructions may be selected from multiple distinct versions of operating instructions based on requirements for decoding data from barcodes of certain formats associated with the identification parameter.

Alternatively or additionally, the operating instructions may further include instructions necessary to drive the image sensor to capture an image of a barcode within a field of view. The operating instructions may be selected from multiple distinct versions of operating instructions based on requirements for driving the image sensor associated with the identification parameter.

According to one aspect of the invention, there is provided a barcode reader for decoding and manipulating data from a barcode and providing the decoded and manipulated data to a remote computing system. The barcode reader may include barcode reading hardware, including an image sensor which captures an image of a barcode within the field of view, and a processor. The processor may execute executable code which generates decoded data representative of data encoded in the barcode, formats the decoded data, and sends the formatted decoded data to the remote computing system, only when the processor executes formatting and routing instructions which the barcode reader obtains from a remote configuration server upon power up of the barcode reader.

Alternatively or additionally, the barcode reader may further include a non-volatile memory with first executable code. The first executable code may include a decoder, which may be instructions executed by the processor to obtain decoded data from the image of the barcode. The processor may further execute the first executable code to drive a communication interface to obtain the formatting and routing instructions from the remote configuration server. The formatting and routing instructions, when executed by the processor, may format decoded data provided by the decoder and direct output of the formatted decoded data to the remote computing system.

Alternatively or additionally, the processor, executing the first executable code, may further provide an identification parameter to the configuration server. The formatting and routing instructions may be selected from multiple distinct versions of formatting and routing instructions may be based on at least one of: i) requirements for formatting the decoded data that are associated with the identification parameter; and ii) requirements for routing the decoded data that are associated with the identification parameter.

Alternatively or additionally, the barcode reader may be incapable of providing formatted decoded data to the remote computing system after power-up of the barcode reader and prior to obtaining the formatting and routing instructions from the remote configuration server.

Alternatively or additionally, the barcode reader may further include a volatile memory storing the formatting and routing instructions obtained from the remote configuration server so long as the volatile memory remains in a refresh state. All instances of the formatting and routing instructions on the reader may be decimated with no instances remaining on the reader when the volatile memory resets or fails to refresh.

Alternatively or additionally, the barcode reader may further include a non-volatile memory with first executable code. The first executable code may include a decoder, which may be instructions executed by the processor to obtain decoded data from the image of the barcode. The processor may further execute the first executable code to drive a communication interface to obtain the formatting and routing instructions from the remote configuration server. The first executable code may include a decoder, which may be instructions executed by the processor to decode the image of the barcode thereby generating a character string representative of data encoded in the barcode. The formatting and routing instructions, when executed by the processor, may perform at least one of generating decoded data by adding leading or trailing characters to the character string, generating decoded data by modifying the format of the character string, and transferring the decoded provide decoded data to the remote computing system via the communication interface.

Alternatively or additionally, the processor, executing the first executable code, may further provide an identification parameter to the configuration server. The formatting and routing instructions may be selected from multiple distinct versions of formatting and routing instructions may be based on at least one of: i) requirements for formatting the decoded data that are associated with the identification parameter; and ii) requirements for routing the decoded data that are associated with the identification parameter.

Alternatively or additionally, the barcode reader may be incapable of providing formatted decoded data to the remote computing system after power-up of the barcode reader and prior to obtaining the formatting and routing instructions from the remote configuration server.

Alternatively or additionally, the barcode reader may further have a volatile memory storing the formatting and routing instructions obtained from the remote configuration server so long as the volatile memory remains in a refresh state. All instances of the formatting and routing instructions on the reader may be decimated with no instances remaining on the reader when the volatile memory resets or fails to refresh.

According to one aspect of the invention, there is provided a barcode reader for providing decoded data to a remote computing system. The barcode reader may include an image sensor for capturing an image of a barcode within a field of view, a communication interface, volatile memory, non-volatile memory with first executable code, and a processor. The processor may execute the first executable code to utilize the communication interface to receive formatting and routing instructions from the configuration server, load the formatting and routing instructions to the volatile memory, and execute the formatting and routing instructions to format the decoded data and route the formatted decoded data to the remote computing system.

Alternatively or additionally, the first executable code may include a decoder, which may be instructions executed by the processor to obtain decoded data from an image of a barcode captured by the image sensor. The formatting and routing instructions, when executed by the processor, may format decoded data provided by the decoder and direct output of the formatted decoded data to the remote computing system.

Alternatively or additionally, the barcode reader may be incapable of providing formatted decoded data to the remote computing system after power-up of the barcode reader and prior to obtaining the formatting and routing instructions from the remote configuration server.

Alternatively or additionally, the processor, executing the first executable code, may further provides an identification parameter to the configuration server. The formatting and routing instructions may be selected from multiple distinct versions of formatting and routing instructions may be based on at least one of: i) requirements for formatting the decoded data that are associated with the identification parameter; and ii) requirements for routing the decoded data that are associated with the identification parameter.

Alternatively or additionally, the first executable code may include a decoder, which may be instructions executed by the processor to decode the image of the barcode thereby generating a character string representative of data encoded in the barcode. The formatting and routing instructions, when executed by the processor, may perform at least one of generating decoded data by adding leading or trailing characters to the character string, generating decoded data by modifying the format of the character string, and transferring the decoded provide decoded data to the remote computing system via the communication interface.

Alternatively or additionally, the barcode reader may be incapable of providing formatted decoded data to the remote computing system after power-up of the barcode reader and prior to obtaining the formatting and routing instructions from the remote configuration server.

Alternatively or additionally, the processor, executing the first executable code, may further provide an identification parameter to the configuration server. the formatting and routing instructions may be selected from multiple distinct versions of formatting and routing instructions may be based on at least one of: i) requirements for formatting the decoded data that are associated with the identification parameter, and ii) requirements for routing the decoded data that are associated with the identification parameter.

Alternatively or additionally, the non-volatile memory may further have an identification parameter. The processor, executing the first executable code, may further utilize the communication interface to transfer the identification parameter to the configuration server. The formatting and routing instructions may be selected from multiple distinct versions of formatting and routing instructions based on at least one of: i) requirements for formatting the decoded data that are associated with the identification parameter; and ii) requirements for routing the decoded data that are associated with the identification parameter.

Alternatively or additionally, the first executable code may include a decoder, which may be instructions executed by the processor to obtain decoded data from an image of a barcode captured by the image sensor. The formatting and routing instructions, when executed by the processor, may format decoded data provided by the decoder and direct output of the formatted decoded data to the remote computing system.

Alternatively or additionally, the barcode reader may be incapable of providing formatted decoded data to the remote computing system after power-up of the barcode reader and prior to obtaining the formatting and routing instructions from the remote configuration server.

Alternatively or additionally, the first executable code may include a decoder, which may be instructions executed by the processor to decode the image of the barcode thereby generating a character string representative of data encoded in the barcode. The formatting and routing instructions, when executed by the processor, may perform at least one of generating decoded data by adding leading or trailing characters to the character string, generating decoded data by modifying the format of the character string, and transferring the decoded provide decoded data to the remote computing system via the communication interface.

Alternatively or additionally, the barcode reader may be incapable of providing formatted decoded data to the remote computing system after power-up of the barcode reader and prior to obtaining the formatting and routing instructions from the remote configuration server.

According to one aspect of the invention, there is provided a barcode reader for decoding data from a barcode. The barcode reader may include barcode reading hardware, including an image sensor which captures an image of a barcode within the field of view, and a processor. The processor may i) execute embedded firmware to operate the barcode reading hardware, and ii) generate decoded data representative of data encoded in the barcode by executing supplemental operating instructions which the barcode reader obtains from a remote configuration server upon power up of the barcode reader. The supplemental operating instructions may be distinct from the embedded firmware and may include instructions which, when executed by the processor, enable the barcode reader to output decoded data from the barcode within the field of view.

Alternatively or additionally, the barcode reader may further include a communications interface. The processor, executing the embedded firmware, may drive the communication interface to obtain the supplemental operating instructions from the remote configuration server.

Alternatively or additionally, the processor, executing the embedded firmware may further drive a transfer of the supplemental operating instructions from the communication interface to storage. The storage may be one of volatile memory and the non-volatile memory allocated for storage. The processor, executing the embedded firmware may further determine an addressable location within volatile memory at which the supplemental operating instructions, if loaded, are executable by the processor, load the supplemental operating instructions from storage to the addressable location, and commence execution of the supplemental operating instructions to commence barcode reading functions of the barcode reader.

Alternatively or additionally, the barcode reader may be incapable of providing output of decoded data from the barcode within the field of view prior to obtaining the supplemental operating instructions from the remote configuration server.

Alternatively or additionally, the storage may be the volatile memory. The supplemental operating instructions may be retained in the barcode reader only so long as the volatile memory remains in a refresh state. All instances of the supplemental operating instructions on the reader may be decimated with no instances remaining on the reader when the volatile memory resets or fails to refresh.

Alternatively or additionally, the storage may be non-volatile memory. The processor, executing the embedded firmware, may drive the communication interface to obtain the supplemental operating instructions from the remote configuration server and load the supplemental operating instructions to the addressable location upon power up of the reader. Notwithstanding this, the non-volatile memory may include an instance of the supplemental operating instructions obtained from the configuration server during a previous power-up of the reader.

Alternatively or additionally, the barcode reader may be configured to be incapable of providing output of decoded data from the barcode within the field of view prior to obtaining the supplemental operating instructions from the remote configuration server upon power-up. Notwithstanding this, the non-volatile memory may include an instance of the supplemental operating instructions obtained from the configuration server during a previous power-up of the reader.

Alternatively or additionally, the processor, executing the embedded firmware may further: i) determine an identification parameter, and ii) drive the communication interface to provide the identification parameter to the configuration server. The supplemental operating instructions may be selected from multiple distinct versions of supplemental operating instructions based on the identification parameter.

Alternatively or additionally, the identification parameter may be stored in non-volatile memory of the reader. Determining the identification parameter may include reading the identification parameter from the non-volatile memory.

According to one aspect of the invention, there may be provided a barcode reader for providing decoded data to a remote computing system. The barcode reader may include barcode reading hardware, including an image sensor which captures an image of a barcode within the field of view, and a communication interface for output of decoded data to a remote computing system. The barcode reader may further include volatile memory, non-volatile memory with operating instructions, and a processor. The processor may be configured to, upon power-up of the barcode reader, load the operating instructions from the non-volatile memory to volatile memory and commence execution of the operating instructions, execute the operating instructions to obtain supplemental operating instructions from a remote configuration server, allocate an addressable location within the volatile memory at which the supplemental operating instructions, if loaded, would be executable by the processor, load the supplemental operating instructions to the addressable location, and commence execution of a combination of both the operating instructions and the supplemental operating instructions to commence barcode reading functions of the barcode reader without performing a re-boot operation.

Alternatively or additionally, the processor may further be configured to drive a transfer of the supplemental operating instructions from the communication interface to storage. The storage may be one of the volatile memory and the non-volatile memory allocated for storage. The processor may further be configured to load the supplemental operating instructions from storage to the addressable location, and commence execution of the supplemental operating instructions without performing a re-boot operation.

Alternatively or additionally, the barcode reader may be incapable of providing output of decoded data from the barcode within the field of view prior to obtaining the supplemental operating instructions from the remote configuration server.

Alternatively or additionally, the storage may be the volatile memory. The supplemental operating instructions may be retained in the barcode reader only so long as the volatile memory remains in a refresh state. All instances of the supplemental operating instructions on the reader may be decimated with no instances remaining on the reader when the volatile memory resets or fails to refresh.

Alternatively or additionally, the storage may be non-volatile memory. The processor, executing the operating instructions, may drive the communication interface to obtain the supplemental operating instructions from the remote configuration server and load the supplemental operating instructions to the addressable location upon power up of the reader. Notwithstanding this, the non-volatile memory may include an instance of the supplemental operating instructions obtained from the configuration server during a previous power-up of the reader.

Alternatively or additionally, the barcode reader may be configured to be incapable of providing output of decoded data from the barcode within the field of view prior to obtaining the supplemental operating instructions from the remote configuration server upon power-up. Notwithstanding this, the non-volatile memory may include an instance of the supplemental operating instructions obtained from the configuration server during a previous power-up of the reader.

Alternatively or additionally, the processor, executing the operating instructions, may further: i) determine an identification parameter, and ii) drive the communication interface to provide the identification parameter to the configuration server. The supplemental operating instructions may be selected from multiple distinct versions of supplemental operating instructions based on the identification parameter.

Alternatively or additionally, the identification parameter may be stored in non-volatile memory of the reader. Determining the identification parameter may include reading the identification parameter from the non-volatile memory.

According to one aspect of the invention, there is provided a barcode reader for providing decoded data to a remote computing system. The barcode reader may include barcode reading hardware, including an image sensor which captures an image of a barcode within the field of view, and a communication interface for output of decoded data to a remote computing system. The barcode reader may further include volatile memory, non-volatile memory with core operating instructions, and a processor. The processor may be configured to, upon power-up of the barcode reader, load the core operating instructions from the non-volatile memory to volatile memory and commence execution of the operating instructions, execute the core operating instructions to determine whether a configuration event has occurred, and, upon the occurrence of a configuration event, obtain supplemental operating instructions from a remote configuration server. The processor may further be configured to allocate an addressable location within the volatile memory at which the supplemental operating instructions, if loaded, would be executable by the processor, load the supplemental operating instructions to the addressable location, and commence execution of a combination of both the operating instructions and the supplemental operating instructions to commence barcode reading functions of the barcode reader without performing a re-boot operation.

Alternatively or additionally, the processor may further be configured to drive a transfer of the supplemental operating instructions from the communication interface to storage. The storage may be one of the volatile memory and the non-volatile memory allocated for storage. The processor may further be configured to load the supplemental operating instructions from storage to the addressable location and commence execution of the supplemental operating instructions without performing a re-boot operation.

Alternatively or additionally, the barcode reader may be configured to cease the provision of output of decoded data from the barcode within the field of view following the occurrence of a configuration event and prior to obtaining the supplemental operating instructions from the remote configuration server.

Alternatively or additionally, the storage may be the volatile memory, power-up of the reader may be a configuration event, and the supplemental operating instructions may be retained in the barcode reader only so long as the volatile memory remains in a refresh state. All instances of the supplemental operating instructions on the reader may be decimated with no instances remaining on the reader when the volatile memory resets or fails to refresh.

Alternatively or additionally, the storage may be non-volatile memory. The processor, executing the operating instructions, may drive the communication interface to obtain the supplemental operating instructions from the remote configuration server and load the supplemental operating instructions to the addressable location upon the occurrence of a configuration event. Notwithstanding this, the non-volatile memory may include an instance of the supplemental operating instructions obtained from the configuration server during a previous power-up of the reader.

Alternatively or additionally, the barcode reader may be configured to cease the provision of output of decoded data following the occurrence of a configuration event and prior to obtaining the supplemental operating instructions from the remote configuration server.

Alternatively or additionally, the processor, executing the operating instructions, may further: i) determine an identification parameter, and ii) drive the communication interface to provide the identification parameter to the configuration server. The supplemental operating instructions may be selected from multiple distinct versions of supplemental operating instructions based on the identification parameter.

Alternatively or additionally, the identification parameter may be stored in non-volatile memory of the reader. Determining the identification parameter may include reading the identification parameter from the non-volatile memory.

According to one aspect of the invention, there is provided a barcode reader for providing decoded data to a remote computing system. The barcode reader may include barcode reading hardware, including an image sensor which captures an image of a barcode within the field of view, and a communication interface for output of decoded data to a remote computing system. The barcode reader may further include volatile memory, non-volatile memory with start-up instructions, and a processor. The processor may be configured to, upon power-up of the barcode reader, execute the start-up instructions to obtain firmware for operating the barcode reader from a remote configuration server, load the firmware to volatile memory, and commence execution of the firmware to commence barcode reading functions of the barcode reader without performing a re-boot operation.

Alternatively or additionally, the processor may further be configured to drive a transfer of the firmware from the communication interface to a portion of the volatile memory allocated for storage, determine an addressable location within the volatile memory at which the firmware, if loaded, can be executed by the processor, load the supplemental operating instructions from storage to the addressable location, and commence execution of the supplemental operating instructions without performing a re-boot operation.

Alternatively or additionally, the barcode reader may be incapable of providing output of decoded data from the barcode within the field of view prior to obtaining the firmware from the remote configuration server.

Alternatively or additionally, the firmware may be retained in the barcode reader only so long as the volatile memory remains in a refresh state. All instances of the supplemental operating instructions on the reader may be decimated with no instances remaining on the reader when the volatile memory resets or fails to refresh.

Alternatively or additionally, the addressable location may be a location within volatile memory where the physical address of the volatile memory align with addresses that are reference internally in the executable code such that the firmware is executable immediately upon being loaded to the volatile memory at the addressable location.

Alternatively or additionally, the addressable location may be defined by a start address stored in the non-volatile memory. The firmware may be loaded to the addressable location by commencing loading of the firmware at the start address. The processor may begin execution of the firmware by executing the instruction at the start address.

Alternatively or additionally, the addressable location may be defined by a start address identified by the remote configuration server. The firmware may be loaded to the addressable location by commencing loading of the firmware at the start address. The processor may begin execution of the firmware by executing the instruction at the start address.

Alternatively or additionally, the start address may be identified in a header to a file provided by the configuration server that contains the firmware.

Alternatively or additionally, the firmware may have instructions necessary to drive the image sensor to capture the image.

Alternatively or additionally, the firmware may include a decoder, which may be instructions executed by the processor to obtain the decoded data from the image of the barcode captured by the image sensor.

Alternatively or additionally, an identification parameter may be stored in non-volatile memory of the reader. The processor, executing the start-up instructions, may further provide the identification parameter to the configuration server. The firmware may be selected from multiple distinct versions of firmware based on the identification parameter.

According to one aspect of the invention, there is provided a barcode reader for providing decoded data to a remote computing system. The barcode reader may have a communication interface, volatile memory, non-volatile memory with an identification parameter and start-up instructions, and a processor. The processor may be configured to execute the start-up instructions to provide the identification parameter to a configuration server and receive executable code from the configuration server based on the identification parameter. The executable code may include a header that indicates a start address for the executable code. The processor may further be configured to load the executable code to the volatile memory at a first location that begins at a first address different than the start address, determine the start address for the executable code by reading the header within the executable code, load the executable code to a second location within the volatile memory, the second location beginning at the start address, and execute the executable code.

Alternatively or additionally, the first address may not align with addresses that are referenced internally in the executable code such that the executable code is not executable upon being loaded to the volatile memory at the first location that begins at the first address. The start address may align with the addresses that are referenced internally in the executable code such that the executable code is executable immediately upon being loaded to the volatile memory at the second location that begins at the start address.

Alternatively or additionally, the barcode reader may be incapable of providing the decoded data to the remote computing system after power-up of the barcode reader and prior to executing the executable code received from the configuration server.

Alternatively or additionally, the barcode reader may not be rebooted between (i) receiving the executable code from the configuration server, and (ii) executing the executable code.

Alternatively or additionally, the barcode reader may further include an image sensor for capturing an image of a barcode within a field of view. The executable code may further have instructions necessary to drive the image sensor to capture the image.

Alternatively or additionally, the barcode reader may further have an image sensor for capturing an image of a barcode within a field of view. The executable code may further include a decoder, which may be instructions executed by the processor to obtain the decoded data from the image of the barcode captured by the image sensor.

Alternatively or additionally, the executable code may be selected from multiple distinct versions of executable code based on the identification parameter.

According to one aspect of the invention, there is provided a barcode reader for providing decoded data to a remote computing system. The barcode reader may include a communication interface, volatile memory, non-volatile memory with an identification parameter, start-up instructions, and a start address defining addressable address space in the volatile memory at which a firmware if loaded, if loaded, will execute, and a processor. The processor may be configured to execute the start-up instructions to provide the identification parameter to a configuration server and receive a firmware image from the configuration server based on the identification parameter, load the firmware image at the addressable address space, and begin execution of the firmware image at the start address to commence operation of the barcode reader.

Alternatively or additionally, the addressable location may be a location within volatile memory where the physical address of the volatile memory aligns with addresses that are referenced internally in the firmware image such that the firmware image is executable immediately upon being loaded to the volatile memory at the addressable location.

Alternatively or additionally, the barcode reader may be incapable of providing output of decoded data from the barcode within the field of view prior to obtaining the firmware image from the remote configuration server.

Alternatively or additionally, the firmware image may be retained in the barcode reader only so long as the volatile memory remains in a refresh state. All instances of the firmware on the reader may be decimated with no instances remaining on the reader when the volatile memory resets or fails to refresh.

According to one aspect of the invention, there is provided a host device coupled to a barcode reader. The barcode reader may include an image sensor for capturing an image of a barcode within a field of view of the barcode reader. The host device may include a point-to-point communication interface, a network interface, a processor, memory in electronic communication with the processor, and instructions stored in the memory. The instructions may be executable by the processor to establish a point-to-point connection with a barcode reader via the point-to-point communication interface, and determine that the barcode reader is in a state wherein executable instructions necessary for providing, to the host device, data decoded from a barcode within the field of view of the barcode reader, is not present within memory of the barcode reader. The instructions may further be executable by the processor to use the network interface to connect to a configuration server and to receive from the configuration server, executable instructions required for the barcode reader to be capable of providing, to the host device, data decoded from a barcode within the field of view of the barcode reader. The instructions may further be executable by the processor to provide the executable instructions to the barcode reader via the point-to-point connection, and receive from the barcode reader, via the point to point interface, data decoded from a barcode within the field of view of the barcode reader only after the executable instructions have been loaded to volatile memory or the barcode reader.

Alternatively or additionally, determining that the barcode reader is in a state wherein executable instructions necessary for decoding a barcode is not present within memory of the barcode reader may include obtaining an identification parameter from the barcode reader. Using the network interface to receive executable instructions from the configuration server may include providing the identification parameter to the configuration server. The executable instructions may be selected from multiple distinct versions of executable instructions based on requirements for operating the barcode reader which are associated with the identification parameter.

Alternatively or additionally, the executable instructions may include internal memory address references, including a start of execution address, configured such that the executable instructions will execute when loaded to physical memory at physical memory addresses which align to the internal memory address references. The start of execution address may correspond to a predetermined address at which a processor in the reader is preconfigured to begin execution of the executable instructions.

Alternatively or additionally, the executable instructions may include internal memory address references configured such the executable instructions will execute when loaded to physical memory at physical memory addresses which align to the internal memory address references, and a header including a physical memory address specification specifying the physical memory addresses which align to the internal memory references. The barcode reader may read the physical memory address specification from the header and load the executable instructions to physical memory addresses which align with the internal memory references.

Alternatively or additionally, the executable instructions may include decoder instructions necessary for generating data decoded from an image of a barcode captured by the image sensor.

Alternatively or additionally, the executable instructions may include internal memory address references, including a start of execution address, configured such that the executable instructions will execute when loaded to physical memory at physical memory addresses which align to the internal memory address references. The start of execution address may correspond to a predetermined address at which a processor in the reader is preconfigured to begin execution of the executable instructions.

Alternatively or additionally, the executable instructions may include internal memory address references configured such the executable instructions will execute when loaded to physical memory at physical memory addresses which align to the internal memory address references, and a header including a physical memory address specification specifying the physical memory addresses which align to the internal memory references. The barcode reader may read the physical memory address specification from the header and load the executable instructions to physical memory addresses which align with the internal memory references.

Alternatively or additionally, the executable instructions may include instructions necessary for driving the image sensor to capture an image of a barcode within a field of view of the barcode reader.

Alternatively or additionally, the executable instructions may include internal memory address references, including a start of execution address, configured such that the executable instructions will execute when loaded to physical memory at physical memory addresses which align to the internal memory address references. The start of execution address may correspond to a predetermined address at which a processor in the reader may be preconfigured to begin execution of the executable instructions.

Alternatively or additionally, the executable instructions may include internal memory address references configured such the executable instructions will execute when loaded to physical memory at physical memory addresses which align to the internal memory address references, and a header including a physical memory address specification specifying the physical memory addresses which align to the internal memory references. The barcode reader may read the physical memory address specification from the header and load the executable instructions to physical memory addresses which align with the internal memory references.

According to one aspect of the invention, there may be provided a host device coupled to a barcode reader. The barcode reader may have an image sensor for capturing an image of a barcode within a field of view of the barcode reader. The host device may include a point-to-point communication interface, a network interface, a processor, memory in electronic communication with the processor, and instructions stored in the memory. The instructions may be executable by the processor to establish a point-to-point connection with a barcode reader via the point-to-point communication interface. When the barcode reader is in a state wherein executable instructions necessary for providing, to the host device, data decoded from a barcode within the field of view of the barcode reader, is not present within memory of the barcode reader, the instructions may be executable by the processor to use the network interface to connect to a configuration server, receive from the configuration server, executable instructions required for the barcode reader to be capable of providing, to the host device, data decoded from a barcode within the field of view of the barcode reader, and provide the executable instructions to the barcode reader vie the point-to-point connection. When the barcode reader is in a state wherein the executable instructions necessary for providing, to the host device, data decoded from a barcode within the field of view of the barcode reader, are present within memory of the barcode reader, the instructions may further be executable by the processor to receive from the barcode reader, via the point to point interface, decoded data from a barcode within the field of view of the barcode reader.

Alternatively or additionally, the instructions stored in memory and being executable by the processor may further include determining, based on information provided by the reader via the point to point communication interface, whether the barcode reader is in the state wherein executable instructions necessary for providing, to the host device, data decoded from a barcode within the field of view of the barcode reader, is not present within memory of the barcode reader, and whether the barcode reader is in a state wherein the executable instructions necessary for providing, to the host device, data decoded from a barcode within the field of view of the barcode reader, are present within memory of the barcode reader. When the executable instructions required for the barcode reader to be capable of providing, to the host device, data decoded from a barcode within the field of view of the barcode reader, the instructions stored in memory and being executable by the processor ma further include receiving from the barcode reader, via the point to point interface, decoded data from a barcode within the field of view of the barcode reader.

Alternatively or additionally, the information provided by the reader may include a configuration parameter when the barcode reader is in a state wherein the executable instructions necessary for providing, to the host device, data decoded from a barcode within the field of view of the barcode reader, are present within memory of the barcode reader. Receiving from the configuration server, executable instructions required for the barcode reader to be capable of providing, to the host device, data decoded from a barcode within the field of view of the barcode reader, may include providing the identification parameter to the configuration server. The executable instructions may be selected from multiple distinct versions of executable instructions based on requirements for operating the barcode reader which are associated with the identification parameter.

Alternatively or additionally, the executable instructions may include internal memory address references, including a start of execution address, configured such that the executable instructions will execute when loaded to physical memory at physical memory addresses which align to the internal memory address references. The start of execution address may correspond to a predetermined address at which a processor in the reader is preconfigured to begin execution of the executable instructions.

Alternatively or additionally, the executable instructions may include internal memory address references configured such that the executable instructions will execute when loaded to physical memory at physical memory addresses which align to the internal memory address references. The executable instructions may further include a header including a physical memory address specification specifying the physical memory addresses which align to the internal memory references. The barcode reader may read the physical memory address specification from the header and load the executable instructions to physical memory addresses which align with the internal memory references.

Alternatively or additionally, the executable instructions may include decoder instructions necessary for generating data decoded from an image of a barcode captured by the image sensor.

Alternatively or additionally, the executable instructions may include internal memory address references, including a start of execution address, configured such that the executable instructions will execute when loaded to physical memory at physical memory addresses which align to the internal memory address references. The start of execution address may correspond to a predetermined address at which a processor in the reader is preconfigured to begin execution of the executable instructions.

Alternatively or additionally, the executable instructions may include internal memory address references configured such the executable instructions will execute when loaded to physical memory at physical memory addresses which align to the internal memory address references. The executable instructions may further include a header including a physical memory address specification specifying the physical memory addresses which align to the internal memory references. The barcode reader may read the physical memory address specification from the header and load the executable instructions to physical memory addresses which align with the internal memory references.

Alternatively or additionally, the executable instructions may include instructions necessary for driving the image sensor to capture an image of a barcode within a field of view of the barcode reader.

Alternatively or additionally, the executable instructions may include internal memory address references, including a start of execution address, configured such that the executable instructions will execute when loaded to physical memory at physical memory addresses which align to the internal memory address references. The start of execution address may correspond to a predetermined address at which a processor in the reader is preconfigured to begin execution of the executable instructions.

Alternatively or additionally, the executable instructions may include internal memory address references configured such the executable instructions will execute when loaded to physical memory at physical memory addresses which align to the internal memory address references. The executable instructions may further include a header including a physical memory address specification specifying the physical memory addresses which align to the internal memory references. The barcode reader may read the physical memory address specification from the header and load the executable instructions to physical memory addresses which align with the internal memory references.

According to one aspect of the invention, there may be provided a host device coupled to a barcode reader. The barcode reader may include an image sensor for capturing an image of a barcode within a field of view of the barcode reader. The host device may include a point-to-point communication interface, a processor, memory in electronic communication with the processor, and instructions stored in the memory. The instructions may be executable by the processor to establish a point-to-point connection with a barcode reader via the point-to-point communication interface, provide the executable instructions required for the barcode reader to be capable of providing, to the host device, data decoded from a barcode within the field of view of the barcode reader, and receive from the barcode reader, via the point to point interface, decoded data from a barcode within the field of view of the barcode reader only after the executable instructions: i) have been provided to the barcode reader by the host device; ii) loaded to volatile memory or the barcode reader; and iii) are being executed by a processor of the barcode reader.

Alternatively or additionally, the executable instructions may include internal memory address references, including a start of execution address, configured such that the executable instructions will execute when loaded to physical memory at physical memory addresses which align to the internal memory address references. The start of execution address may correspond to a predetermined address at which a processor in the reader is preconfigured to begin execution of the executable instructions.

Alternatively or additionally, the executable instructions may include internal memory address references configured such the executable instructions will execute when loaded to physical memory at physical memory addresses which align to the internal memory address references. The executable instructions may further include a header including a physical memory address specification specifying the physical memory addresses which align to the internal memory references. The barcode reader may read the physical memory address specification from the header and load the executable instructions to physical memory addresses which align with the internal memory references.

Alternatively or additionally, the executable instructions may include decoder instructions necessary for generating data decoded from an image of a barcode captured by the image sensor.

Alternatively or additionally, the executable instructions may include internal memory address references, including a start of execution address, configured such that the executable instructions will execute when loaded to physical memory at physical memory addresses which align to the internal memory address references. The start of execution address may correspond to a predetermined address at which a processor in the reader is preconfigured to begin execution of the executable instructions.

Alternatively or additionally, the executable instructions may include internal memory address references configured such the executable instructions will execute when loaded to physical memory at physical memory addresses which align to the internal memory address references. The executable instructions may further include a header including a physical memory address specification specifying the physical memory addresses which align to the internal memory references. The barcode reader may read the physical memory address specification from the header and load the executable instructions to physical memory addresses which align with the internal memory references.

Alternatively or additionally, the executable instructions may include instructions necessary for driving the image sensor to capture an image of a barcode within a field of view of the barcode reader.

Alternatively or additionally, the executable instructions may include internal memory address references, including a start of execution address, configured such that the executable instructions will execute when loaded to physical memory at physical memory addresses which align to the internal memory address references. The start of execution address may correspond to a predetermined address at which a processor in the reader is preconfigured to begin execution of the executable instructions.

Alternatively or additionally, the executable instructions may include internal memory address references configured such the executable instructions will execute when loaded to physical memory at physical memory addresses which align to the internal memory address references. The executable instructions may further include a header including a physical memory address specification specifying the physical memory addresses which align to the internal memory references. The barcode reader may read the physical memory address specification from the header and load the executable instructions to physical memory addresses which align with the internal memory references.

A number of features are described herein with respect to embodiments of the invention; it will be appreciated that features described with respect to a given embodiment also may be employed in connection with other embodiments.

The invention includes the features described herein, including the description, the annexed drawings, and, if appended, the claims, which set forth in detail certain illustrative embodiments. These embodiments are indicative, however, of but a few of the various ways in which the principles of the invention may be employed.

DETAILED DESCRIPTION

The present invention will now be described with reference to a number of embodiments, each of which is merely exemplary. Any component, feature, or functionality mentioned in connection with any of these embodiments should be regarded as optional; hence, the scope of the invention is not limited by the following examples, but rather by the appended claims.

Figure 1:
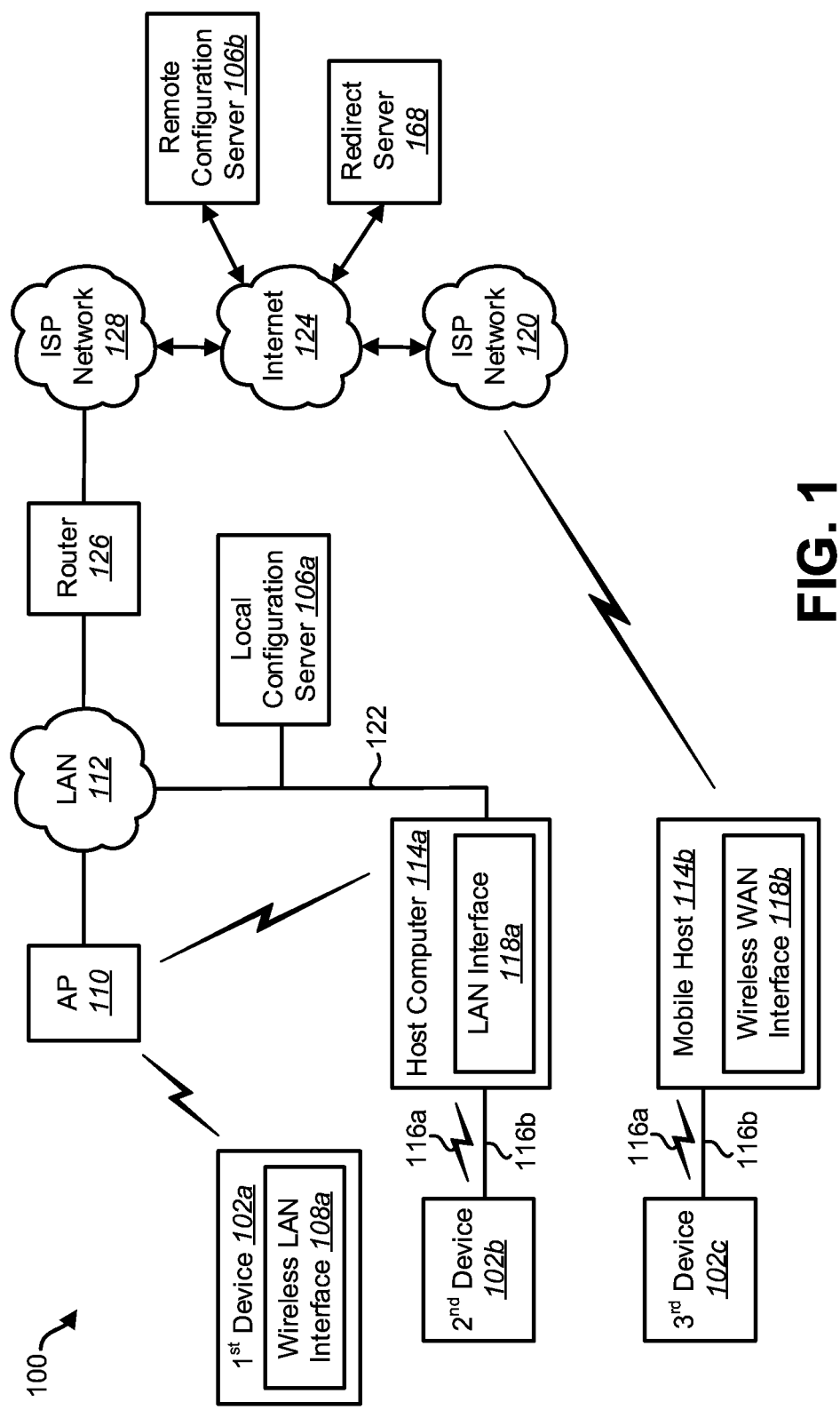
FIG. 1 illustrates one embodiment of a system wherein devices (e.g., barcode readers) obtain operating instructions from a configuration server.

FIG. 1 illustrates a system 100 according to one embodiment of the invention wherein devices 102, which may be barcode readers 102, obtain executable code necessary for operation of the device 102 in the form of operating instructions 104 (shown in FIG. 2) from a configuration server 106. The operating instructions 104 may be referred to as "executable code." The configuration server 106 may be, for example, a local configuration server 106a or a remote configuration server 106b. The system 100 may include at least three different categories of devices 102.

A first device 102a may include a wireless local area network (LAN) interface 108a communicating with a remote access point 110 of a wireless portion of a LAN 112, such that the first device 102a itself is an addressable endpoint on the LAN 112, meaning that the first device 102a is assigned an IP address and is capable of IP communications with other devices over the LAN 112 using IP protocols such as TCP and UDP. The wireless portion of the LAN 112 and the wireless LAN interface 108a of the first device 102a may function in accordance with any known wireless communications protocol, including but not limited to the Institute of Electrical and Electronics (IEEE) 802.11 standards, which are sometimes referred to as Wi-Fi™. The wireless LAN interface 108a within the first device 102a may communicate with Wi-Fi™ access points (such as the remote access point 110) as the first device 102a roams within the coverage area of the wireless portion of the LAN 112. As will be discussed in more detail, the first device 102a obtains operating instructions 104 from a configuration server 106 (e.g., the local configuration server 106a and/or the remote configuration server 106b) via its network connection to the configuration server 106.

A second device 102b may be connected to a host computer 114a via a point-to-point connection 116, which may be a wireless point-to-point connection 116a (e.g., Bluetooth®) or a wired point-to-point connection 116b (e.g., Universal Serial Bus (USB)). The host computer 114a in turn includes a wired and/or wireless LAN interface 118a for communication with a switch (not shown) or a remote access point 110 of the LAN 112 such that the host computer 114a is an addressable endpoint on the LAN 112. As will be discussed in more detail, the second device 102b obtains operating instructions 104 from a configuration server 106 (e.g., the local configuration server 106a and/or the remote configuration server 106b) via its point-to-point connection 116 to the host computer 114a, which communicates with the configuration server 106 via the LAN 112.

A third device 102c may be connected to a mobile host 114b via a point-to-point connection 116, which may be a wireless point-to-point connection 116a (e.g., Bluetooth®) or a wired point-to-point connection 116b (e.g., USB). The mobile host 114b may include a wireless wide area network (WAN) interface 118b for wireless communication with the network 120 of an Internet service provider (ISP). For example, the ISP could be a mobile telephone service provider and the wireless WAN interface 118b could be a circuit for wireless data communications with the access towers of the ISP's network 120. Such wireless data communications may occur in accordance with any suitable wireless communication standard, including 3G standards (e.g., UMTS, CDMA2000, EDGE, etc.) and/or 4G standards (e.g., LTE, Mobile WiMAX, etc.). As will be discussed in more detail, the third device 102c may obtain operating instructions 104 from a configuration server 106 (e.g., the local configuration server 106a and/or the remote configuration server 106b) via its point-to-point connection 116 to the mobile host 114b, which communicates with the configuration server 106 via the ISP's network 120.

The LAN 112 may comprise a wired backbone network 122 and one or more remote access points 110 such that addressable end point devices (wired or wireless) communicate with each other using TCP/IP communication protocols and communicate with remote TCP/IP devices over the Internet 124 through a router 126 that interconnects the LAN 112 with an ISP's network 128 and ultimately the Internet 124. The local configuration server 106a may be coupled to the LAN 112 and may be an addressable endpoint on the LAN 112. The remote configuration server 106b may be a remote device that is addressable over the Internet 124.

FIG. 1 depicts the LAN 112 coupled to the ISP's network 128 via a single router 126. However, such connections often employ multiple router and firewall systems, including DMZ (Demilitarized Zone) networks. Remote devices (e.g., devices coupled to the Internet 124) may be logically connected to the LAN 112 using Virtual Private Network (VPN) technology. Depiction of a device as an endpoint on the LAN 112 is intended to include a remote device that is logically an endpoint on the LAN 112 via VPN technology. Further, although not depicted as being directly coupled to the LAN 112, mobile host 114b may be a logical endpoint on the LAN 112 via VPN technology.

Figure 2:
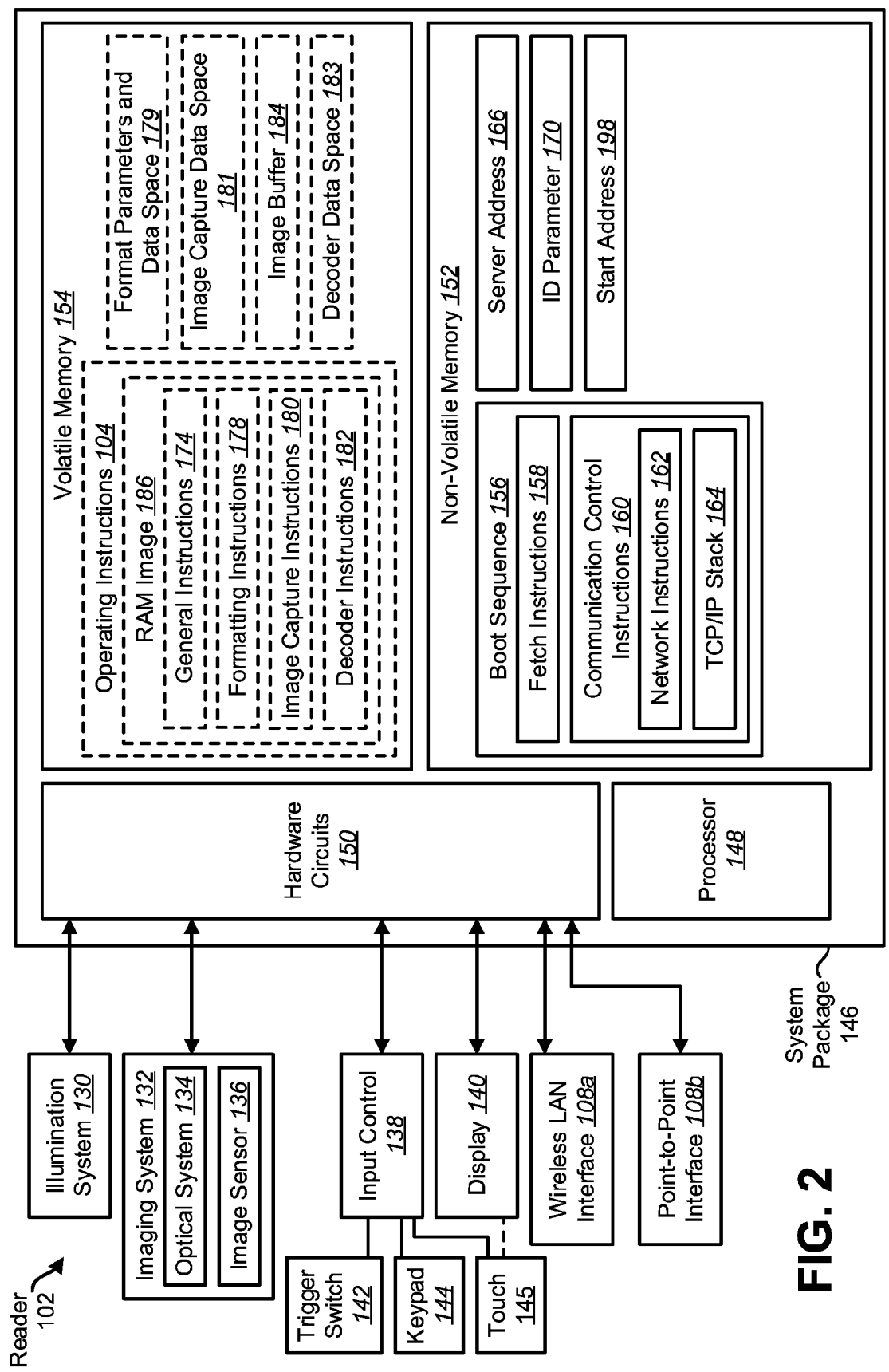
FIG. 2 illustrates an embodiment of a barcode reader in the system shown in FIG. 1.

FIG. 2 illustrates an embodiment of a device 102 in the system 100 shown in FIG. 1. The device 102 may be a barcode reader 102, and may be referred to as such in the following discussion.

The reader 102 may include an illumination system 130 and an imaging system 132. The illumination system 130 may be configured to illuminate a target area, which may include a barcode, while the imaging system 132 captures an image of the barcode. The illumination system 130 may include targeting illumination and one or more sets of exposure illuminators. The illumination system 130 may include multiple illumination systems as described in U.S. patent application Ser. No. 14/105,380 entitled "Barcode Reader Having Multiple Illumination Systems and Multiple Sets of Imaging Optics" filed on Dec. 13, 2013, the contents of which are hereby incorporated by reference. The imaging system 132 may include an optical system 134 and a two-dimensional image sensor 136. The image sensor 136 may comprise a two-dimensional array of pixels and a detector capable of measuring or quantifying light incident on the pixel array. The image sensor 136 may be a CCD sensor, CMOS sensor, etc. The optical system 134 may comprise a single lens or series of lenses capable of focusing light onto the image sensor 136.

The reader 102 may further include a user interface comprising input control 138 and/or a display 140. The input control 138 may include a trigger switch 142, a keypad 144, and/or a touch panel 145, such as a touch screen, over the display 140.

The reader 102 may include one or more communication interfaces 108. More specifically, the reader 102 may include a wireless LAN interface 108a and/or at least one point-to-point interface 108b. The wireless LAN interface 108a may permit the reader 102 to be an addressable endpoint on the LAN 112. The point-to-point interface(s) 108b may include a wired point-to-point interface 108b (e.g., a USB interface) and/or a wireless point-to-point interface 108b (e.g., a Bluetooth® interface). The point-to-point interface(s) 108b may comprise a UART (Universal Asynchronous Receiver/Transmitter). The reader 102 may establish a point-to-point connection 116 with a host device 114 via a point-to-point interface 108b.

Each of the foregoing may be coupled to a system package 146. The system package 146 may include a single package or multiple packages. The system package 146 may include one or more silicon dies that include a processor 148, hardware circuits 150 for operating the components discussed above, non-volatile memory 152, and volatile memory 154. The non-volatile memory 152 may include a combination of read only memory (ROM) and/or flash memory. The non-volatile memory 152 and the volatile memory 154 may together comprise the addressable address space of the reader 102. The processor 148, the communications interface 108, and the imaging system 132 may, together, define barcode reading hardware of the reader 102.

The non-volatile memory 152 may include a boot sequence 156 for initiating operation of the reader 102 upon power-up. The boot sequence 156 may include fetch instructions 158 and communication control instructions 160. The communication control instructions 160 may include network instructions 162 for establishing the reader 102 as an addressable device on the LAN 112 and a TCP/IP stack 164 for TCP/IP communications with remote devices over the LAN 112 and other networks to which the LAN 112 is coupled via the router 126.

In some embodiments, the non-volatile memory 152 may include embedded firmware. Thus, executing the boot sequence 156 may constitute executing instructions of such embedded firmware. If desired, the non-volatile memory 152 may include instructions to operate the barcode reading hardware, which may include the processor 148, the imaging system 132, and the communications interface 108. Alternatively or additionally, such instructions may be included in the operating instructions 104 obtained from the configuration server 106, as will be set forth in detail below.

The network instructions 162 may include instructions for searching for, and connecting to, an available network. The network instructions 162 may include network credentials, such as an SSID (service set identifier) and password, for logging on to a secure network. Alternatively or additionally, the network instructions 162 may include instructions for obtaining an SSID and a password from a user and/or from a host device 114.

The non-volatile memory 152 may also include a server address 166. The server address 166 may include a routable IP address and port number to which the reader 102 is to connect to obtain either (i) operating instructions 104, or (ii) a redirect address (another IP address and port number) to which the reader 102 is to connect to obtain operating instructions 104. In other words, the server address 166 may correspond to a configuration server 106, or the server address 166 may correspond to a redirect server 168.

If the reader 102 obtains operating instructions 104 via a point-to-point connection 116 to a host device 114 (using a point-to-point interface 108b), it may not be necessary for the reader 102 to store the server address 166.

The non-volatile memory 152 may also include an identification (ID) parameter 170. The ID parameter 170 may include an identifier or look-up key used by the configuration server 106 (which may be at the server address 166 or the redirect address) to determine which of multiple operating instructions 104 are to be provided to the reader 102.

The ID parameter 170 may identify the type of reader 102. For example, the ID parameter 170 may identify the hardware of the reader 102 distinct from alternate hardware of other readers supported by the configuration server. In other words, the operating instructions 104 may be dependent on the hardware of the reader 102.

Alternatively or additionally, the ID parameter 170 may identify the reader 102 itself. For example, the ID parameter 170 may be a reader ID (e.g., a serial number) distinct from alternate serial numbers of other readers supported by the configuration server. In other words, the operating instructions 104 may be dependent on the reader ID. The operating instructions 104 may advantageously be retrieved from a set of multiple different operating instructions stored on the configuration server 106. The particular operating instructions 104 for the reader 102 may be selected from those available on the configuration server 106 based, at least in part, on the ID parameter 170. This will be shown and described in greater detail in connection with FIG. 5.

Alternatively or additionally, the ID parameter 170 may identify an application running on the reader 102. For example, the ID parameter 170 may be an application ID, which may identify one or more job(s)/task(s) that the user is performing with the reader 102 which is distinct from other job(s)/task(s) performed by other readers supported by the configuration server. In other words, the operating instructions 104 may be dependent on the job(s)/task(s) to be performed.

Alternatively or additionally, the ID parameter 170 may identify a user of the reader 102. For example, the ID parameter 170 may be a user ID which is distinct from other user IDs supported by the configuration server. In other words, the operating instructions 104 may be dependent on the user ID. Alternatively or additionally, the user ID may be a proxy for identifying the application, and the operating instructions 104 may be dependent on the application.

Alternatively or additionally, the ID parameter 170 may identify a location of the reader 102 distinct from locations of other readers supported by the configuration server. In other words, the operating instructions 104 may be dependent on the location of the reader 102. Alternatively or additionally, the location of the reader 102 may be a proxy for identifying the application, and the operating instructions 104 may be dependent on the application.

The fetch instructions 158 may be executable by the processor 148 in response to a configuration event (defined below) to: (i) utilize a communication interface 108 (which may be controlled by the communication control instructions 160) to obtain the operating instructions 104 from a configuration server 106; (ii) load the operating instructions 104 into the volatile memory 154 at an address space, and (iii) when applicable, pass control to the operating instructions 104.

The boot sequence 156 may optionally be used to initiate communication between the processor 148 and the volatile memory 154 prior to fetching of the operating instructions. This may prepare the volatile memory 154 to receive the operating instructions 104.

The operating instructions 104 may advantageously be copied/loaded directly into the volatile memory 154 at address space applicable for it to be executed by the processor without first being copied into the non-volatile memory 152. In the embodiment described in FIG. 2, the operating instructions 104 may be stored in a RAM image 186 that is copied directly into the volatile memory 154 at address space applicable for execution. This may help to expedite the process of making the reader 102 operational after retrieval of the operating instructions 104 has been initiated, and may also minimize the capacity required for the non-volatile memory 152, thereby enabling the use of less expensive hardware for the non-volatile memory 152. Further, copying the operating instructions 104 directly into the volatile memory 154 may help to maintain the integrity of the operating instructions 104 by minimizing the number of copying steps involved.

As mentioned previously, it may be desirable to minimize the capacity required for the non-volatile memory 152. In some embodiments, the non-volatile memory 152 may not be sufficiently large to contain both the boot sequence 156 and the operating instructions 104. Alternatively or additionally, the non-volatile memory 152 may not be sufficiently large to contain all of the elements shown in FIG. 2, i.e., the boot sequence 156, the server address 166, the ID parameter 170, and the start address 198, and the operating instructions 104.

The system package 146 of FIG. 2 may not include a virtual memory manager or an operating system per se. Rather, the reader 102 of FIG. 2 may be a simplified reader, which may include hardware-embedded instructions or the like. However, the present invention is also applicable to devices such as smartphones that use software-based operating systems and/or memory managers. One such embodiment will be shown and described in connection with FIG. 4.

Returning to the reader 102 of FIG. 2, the non-volatile memory 152 may store a start address 198, which may provide the address in the volatile memory 154 at which one or more elements or portions of the operating instructions 104 are to be loaded or placed. The start address 198 may provide a memory address specification indicating a physical address at which the operating instructions 104 may be loaded such that the physical memory addresses of the volatile memory 154 align with the internal memory references of the operating instructions 104. Thus, if loaded at physical memory addresses starting at the start address 198, the operating instructions 104 may be expected to operate properly.

In some embodiments, the start address 198 may indicate the first memory address at which the RAM image 186 of the operating instructions 104 is to be copied into the volatile memory 154, for example, after the operating instructions 104 have been obtained from the configuration server 106. The RAM image 186 may be a unified block of machine code instructions and data to load within predetermined physical address space. In alternative embodiments, the starting address 198 may instead provide the memory address for other elements of the operating instructions 104 to be stored within the volatile memory 154. In other alternative embodiments, multiple start addresses may be stored in the non-volatile memory 152 to ensure predictable allocation of the volatile memory 154 among multiple elements of the operating instructions 104.

As shown in FIG. 2, the operating instructions 104 that the barcode reader 102 may obtain from a configuration server 106 may include one or more modules that direct various aspects of the operation of the reader 102. For example, the operating instructions 104 may include general instructions 174, formatting instructions 178, image capture instructions 180, and/or decoder instructions 182.

The general instructions 174 may include computer code that directs the overall flow operations carried out by the reader 102 and/or determines the manner in which various subroutines are executed. In some embodiments, the general instructions 174 may include program code that activates and/or passes information between the formatting instructions 178, the image capture instructions 180, the decoder instructions 182, and/or any other code stored within the operating instructions 104 or stored elsewhere in the volatile memory 154 or the non-volatile memory 152. Alternatively or additionally, the general instructions 174 may include configuration parameters pertinent to the various stages of the process of capturing a barcode image, decoding the barcode image to extract the barcode data encapsulated in the barcode image, formatting the barcode data, and/or routing the barcode data to the desired destination.

The formatting instructions 178 may include program code that determines how various data are formatted and/or routed by the reader 102, and may thus be termed "formatting and routing instructions." According to some embodiments, the formatting instructions 178 may determine how data from barcodes are formatted and/or otherwise manipulated for transmission to a remote computing system such as the host computer 114a, the mobile host 114b, and/or a separate recipient computer (not shown) connected to any of the readers 102 via the LAN 112 and/or the Internet 124. The formatting instructions 178 may include an interpreting system for parsing and routing decoded data. The formatting instructions 178 may comprise Java® scripts, and if desired, may store formatting parameters and/or other formatting data such as decoded barcode image data in a format parameters and data space 179 within the volatile memory 154.

In some embodiments, the decoded barcode data provided by the decoder instructions 182 may take the form of a character string representative of the data encoded in the barcode. The formatting instructions 178 may further carry out formatting by adding leading and/or trailing characters to the character string received from the decoder instructions 182. Alternatively or additionally, the formatting instructions 178 may carry out other modifications to the character string to conduct formatting. This formatted, decoded barcode data may then be transmitted to the remote computing device via the communications interface 108, as specified by the formatting instructions 178.

The formatting instructions 178 may further include routing parameters that indicate one or more destinations to which the decoded data are to be routed. For example, if the decoded barcode data are to be stored on a host computer 114a connected to the reader 102, the formatting instructions 178 may include the network address of the host computer 114a and/or the path to the appropriate directory on the host computer 114a where the decoded data are to be stored.

The image capture instructions 180 may provide operational parameters, hardware control drivers, illumination parameters, and/or other data pertinent to the operation of the illumination system and/or the imaging system 132. The image capture instructions 180 may determine the manner in which barcode images are illuminated, captured, encoded, and/or stored by the reader 102. Thus, the imaging capture instructions 180 may include code for controlling the illumination system 30 and/or the image sensor 136. For example, the image capture instructions 180 may include code for operating the illumination system 30 to illuminate the field of view, and code for operating the image sensor 136 to capture an image of a barcode within the field of view during illumination. Operating the image sensor 136 to capture an image may include initiating exposure, controlling exposure period and gain, performing read out, and storing the captured image to volatile memory 154 by direct memory access. Execution of the image capture instructions 180 may be at least partially dependent on or in accordance with configuration settings of the reader 102.

The barcode images may be captured temporarily in an image buffer 184, and then moved into an image capture data space 181 within the volatile memory 154.

The decoder instructions 182 (also known as a "decoder") may provide instructions by which barcode images captured by the image sensor 136 of the reader 102 may be decoded to extract the barcode data they encapsulate. The decoder instructions 182 may be used primarily by the processor 148, which may act as a decoder by processing the barcode images. The decoder instructions 182 may include code for locating and decoding a barcode within an image captured by the image sensor 136. Execution of the decoder instructions 182 may be at least partially dependent on or in accordance with configuration settings of the reader 102, which may optionally be provided by the operating instructions 104. Data pertinent to the decoding process, such as the data generated by various decoding steps and/or the final decoded data, may be stored in a decoder data space 183 within the volatile memory 154.

If desired, the operating instructions 104, or portions of the operating instructions 104, may be included in the non-volatile memory 152 and loaded into the volatile memory 154 when the reader 102 powers up or during boot-up. Additionally or alternatively all, or portions of, the operating instructions 104 may be copied directly into the volatile memory 154 from the configuration server 106 or another source.

The operating instructions 104 may contain a wide variety of modules in addition to or in the alternative to the general instructions 174, the formatting instructions 178, the image capture instructions 180, and the decoder instructions 182 shown in FIG. 2. For example, instructions, such as drivers, for the input control 138, the display 140, the wireless LAN interface 108a, and/or the point-to-point interface 108b may be included in the operating instructions 104. Alternatively, the operating instructions 104 may include fewer elements than those that are shown in FIG. 2. For any portion of the operating instructions 104 stored in non-volatile memory 152, such portions may be updated via one or more procedures carried out independently of the retrieval of the operating instructions from the configuration server 106. Alternatively, these modules may be designed such that they do not require updating or modification.

If desired, once the operating instructions 104 have been copied into the volatile memory 154, the reader 102 may automatically execute the operating instructions 104. Execution of the operating instructions 104 obtained from configuration server 106 may be required to initiate normal operation of the reader 102 to allow the reader 102 to read barcodes, per the various modules of the operating instructions 104. Thus, the reader 102 may not need to reboot, power-off, and/or power-up again between receipt of the operating instructions 104 from the configuration server 106 and execution of the operating instructions 104 to operate the reader 102. The boot sequence 156 may only need to be executed once in order to prepare the reader 102 for use. This may expedite the process of powering up and/or updating the reader 102.

Additionally, execution of the operating instructions 104 without the need for rebooting may help to enhance the security of the reader 102 by ensuring that the operating instructions 104 from the configuration server 106 are the instructions being executed by the reader. If the reader 102 reboots or powers off prior to execution of the operating instructions 104, it may present an opportunity for an unauthorized individual to tamper with the reader 102 in a manner that modifies the operating instructions 104 to include malicious code or the like.

Elimination of a reboot prior to execution of the operating instructions 104 may also enhance the level of control possessed by the configuration server 106. If desired, the reader 102 may be incapable of performing certain functions, such as receiving user input via the trigger switch 142, keypad 144, or touch panel 145 capturing barcode images, decoding barcode images, formatting decoded barcode images, and/or transmitting decoded barcode data to the remote computing system, until the reader 102 has received the operating instructions 104 from the configuration server 106, copied them into the volatile memory 154, and executed them to commence operation of the reader 102. The operation of many readers 102 may be effectively controlled and/or kept secure from a single configuration server 106.

In some embodiments, the reader 102 may be capable of performing certain functions, but not others, prior to execution of the operating instructions 104 from the configuration server 106. For example, if desired, the image capture instructions 180 and the decoder instructions 182 may be stored in the boot sequence 156 or elsewhere in the non-volatile memory 152. Hence, the boot sequence 156 or other contents of the non-volatile memory 152 may constitute "operating instructions" with limited capabilities for controlling the operation of the reader 102. Such limited operating instructions may optionally be loaded into the volatile memory 154 for execution as the reader 102 powers up.

These limited operating instructions may not include the formatting instructions 178. Rather, the formatting instructions 178 may remain only in the operating instructions 104 obtained from the remote configuration server 106 as shown in FIG. 2. Thus, the operating instructions 104 may constitute "supplemental operating instructions" that are not necessary for all operations of the reader 102, but are required to enable some functions of the reader 102, such as the output of decoded barcode data from barcodes that have been read by the reader 102. The full range of barcode reading, decoding, decoded data formatting, and decoded data transmission may then be carried out by the combination of the limited operating instructions and the supplemental operating instructions. Division of the operating instructions in this manner may be combined with any of the other embodiments or variations set forth in this disclosure.

Thus, the image capture instructions 180 and the decoder instructions 182 may be accessible before the operating instructions 104 have been obtained and executed. The reader 102 may then be capable of capturing and decoding barcode images prior to execution of the operating instructions 104. However, the reader 102 may be incapable of formatting and/or routing the decoded barcode images without first obtaining and executing the operating instructions 104. Such an embodiment may advantageously allow the reader 102 to perform scanning operations when disconnected from the configuration server 106. This may enable continued operation in the event of temporary failure or disconnection from the LAN 112 and/or the Internet 124. However, the decoded barcode data may remain secure because they still cannot be transmitted to the remote computing system without execution of the operating instructions 104, including the formatting instructions 178, to ensure that the decoded barcode data are securely routed to the proper remote computing system.

In some embodiments, the operating instructions 104 may be stored in the volatile memory 154 when the volatile memory 154 is in a refresh state. Advantageously, all instances of the operating instructions 104 may be decimated, i.e., deleted, from the reader 102 if the volatile memory 154 resets or fails to refresh. Thus, the reader 102 may have executable code (not shown) that deletes any instances of the operating instructions from the volatile memory 154 and/or the non-volatile memory 152 when any of a number of events occurs, such as failure of the volatile memory 154 to refresh, a reset of the volatile memory, 154, loss of power to the reader 102, and/or receipt of user input to shut down the reader 102.

If desired, an operating system for the reader 102 may even be provided as part of the operating instructions 104. Thus, the reader 102 may be unable to read a barcode and/or perform other computing tasks until the operating instructions 104 have been obtained from the configuration server 106 and executed. This may provide additional security, and will be described in more detail subsequently.

According to alternative embodiments, it may be desirable for the start address 198 and/or the operating system to be identified or provided by configuration server 106 as part of the operating instructions 104. One such embodiment will be shown and described in connection with FIG. 3.

Figure 3:
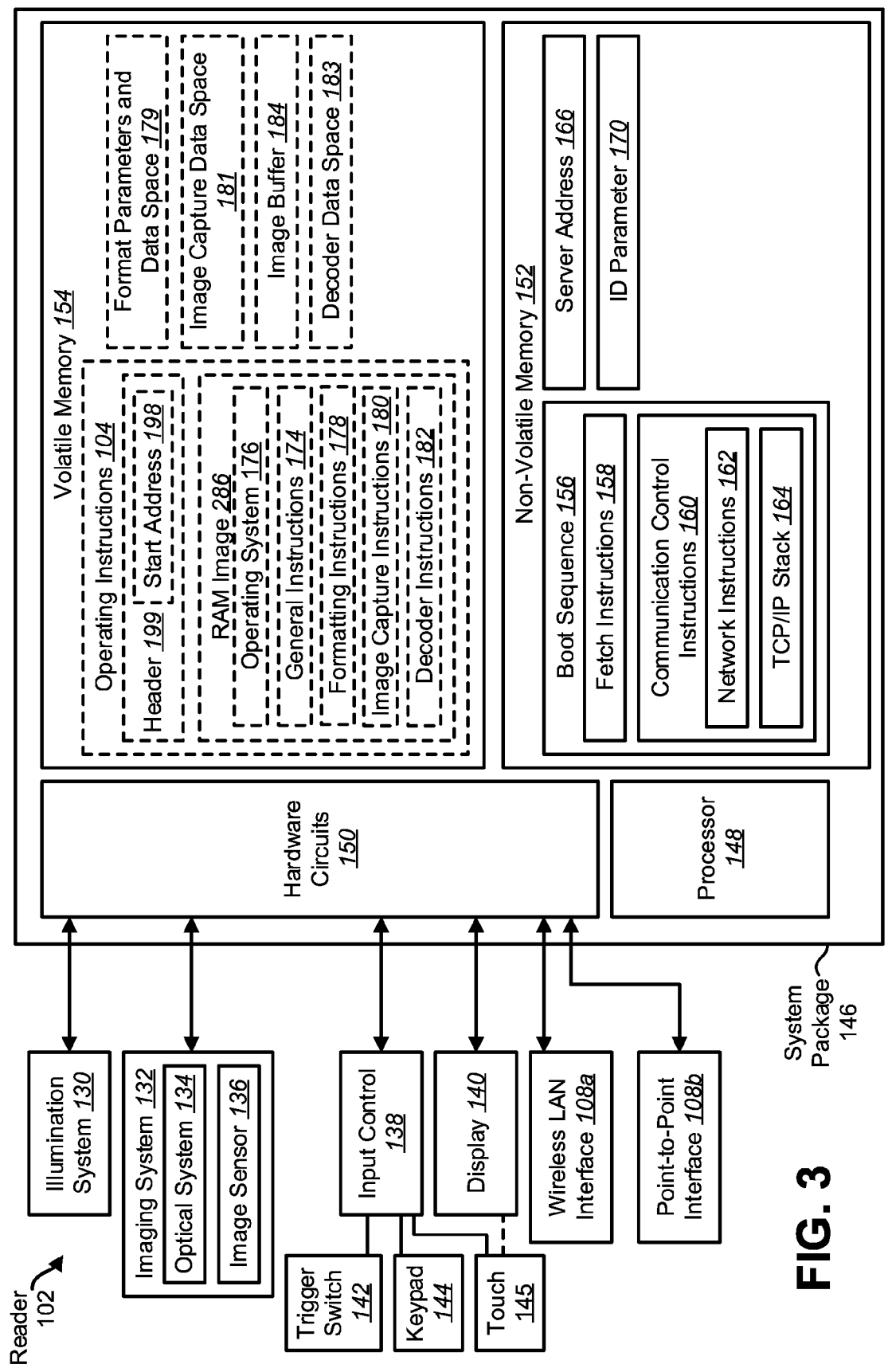
FIG. 3 illustrates the barcode reader of FIG. 2, with a different start address location and method of placing the operating instructions in the volatile memory.

FIG. 3 illustrates a reader 102, which may have the same hardware components as the reader 102 of FIG. 2. The reader 102 may again be a relatively simple computing device, and may optionally be made to function only as a barcode reader.

As shown, the non-volatile memory 152 may, as in FIG. 2, contain a boot sequence 156, which may include fetch instructions 158 that determine how the reader 202 retrieves operating instructions 104 from the configuration server 106. The boot sequence 156 may also include communication control instructions 160 such as network instructions 162 and/or a TCP/IP stack 164, as described in connection with FIG. 2. The non-volatile memory 252 may also contain a server address 166 and an ID parameter 170, which may be similar in function to those of the reader 102 of FIG. 2.

However, rather than storing the start address 198 in the non-volatile memory 152, the start address 198 may instead be identified or contained within a header 199 of the operating instructions 104. Thus, when the operating instructions 104 are retrieved from the configuration server 106, the start address 198 may be part of the package that is received by the reader 102 and copied into the volatile memory 154.

According to some embodiments, when the operating instructions 104 are received by the reader 102, they may first be copied into the volatile memory 154 at a first address that is different from the start address 198. The first address may be an arbitrary location, from which the header 199 can be read. The operating instructions 104 may have memory addresses that are referenced internally, that only align properly with the physical addresses of the volatile memory 154 of the reader 102 when the operating instructions 104 are loaded into the volatile memory 154 at physical memory locations starting with the start address 198. Accordingly, the operating instructions 104 may not operate properly (or may not operate at all) when stored at physical memory locations of the volatile memory 154 starting at the first address, and may need to be moved to physical memory locations of the volatile memory 154 starting at the start address 198.

Accordingly, the reader 102 may receive the start address 198 from the header 199 and may move the operating instructions 104 to the start address 198 from the first address at which the operating instructions 104 were initially stored. The operating instructions 104 may then be executed from their proper location in the volatile memory 154. Execution of the operating instructions 104 may optionally be done directly after the operating instructions 104 have been copied to a location of the volatile memory 154 defined by the start address 198. As discussed in connection with FIG. 2, the operating instructions 104 may be executed without requiring the reader 102 to be rebooted, powered off, and/or powered on.

In the embodiment of FIG. 3, the operating instructions 104 may also contain a RAM image 286 that contains an operating system 176 in addition to the general instructions 174, the formatting instructions 178, the image capture instructions 180, and the decoder instructions 182 described in connection with FIG. 2. Providing the operating system 176 as a part of the operating instructions 104 may prevent the reader 102 from being used for reading barcodes and/or other computing functions until the operating instructions 104 have been received from the configuration server 106, loaded into the volatile memory 154, and executed. In such a case, execution of the operating instructions 104 may optionally commence with execution of the operating system 176.

As mentioned previously, the reader 102 of FIGS. 2 and 3 may be a relatively simple device without an operating system or a memory manager. In alternative embodiments, a reader according to the invention may have more sophisticated architecture, including an operating system and/or memory manager.

Figure 4:
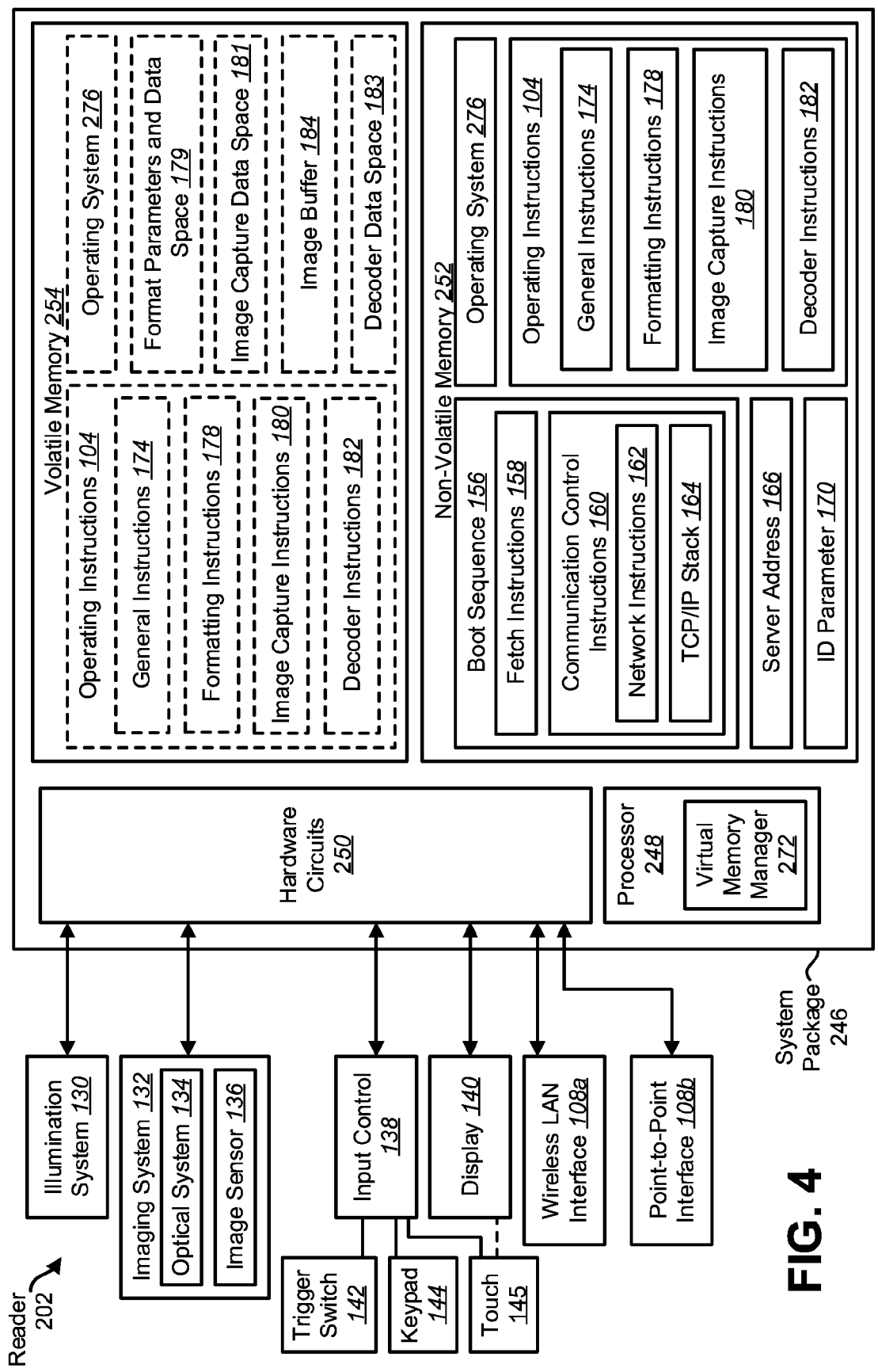
FIG. 4 illustrates another embodiment of a barcode reader in the system shown in FIG. 1.

One example of such a reader is shown in FIG. 4. The reader 202 of FIG. 4 may be a multi-function computing device such as a smartphone, portable computer, or other microprocessor-based computing device. The reader 202 may have a number of hardware features that are the same as, similar to, or analogous in function to those of the reader 102 of FIGS. 2 and 3. More specifically, the reader 202 may have an illumination system 130, an imaging system 132, input control 138 connected to user inputs such as a trigger switch 142, a keypad 144, and/or touch panel 145, a display 140, a wireless LAN interface 108*a*, and/or a point-to-point interface 108*b*. These elements may be connected to hardware circuits 250 of a system package 246, which may also include a processor 248, non-volatile memory 252, and volatile memory 254.

The reader 202 may have an operating system 276 that controls the operation of the reader 202. The operating system 276 may be a multi-function operating system designed to control one or more other functions besides barcode image capture, decoding, formatting, and related data transmission. According to some examples, the operating system 276 may be Windows, Linux, MacOS, iOS, Android, Windows Mobile, Blackberry, or any other known operating system designed for computing devices. According to other examples, the operating system 276 may be none of the foregoing, and may instead be designed specifically for the reader 202.

The processor 248 and/or the operating system 276 may have a virtual memory manager 272 that controls the allocation of the volatile memory 254. The virtual memory manager 272 may map address space from instructions executed by the processor 248 to physical memory locations in the volatile memory 254. The virtual memory manager 272 may be a component of the processor 248 as shown, or may a software or firmware component such as a part of the operating system 276 or a standalone instruction set residing on the non-volatile memory 252.

As in the reader 102 of FIGS. 2 and 3, the non-volatile memory 252 of the reader 202 may store a boot sequence 156, which may include fetch instructions 158 that determine how the reader 202 retrieves operating instructions 104 from the configuration server 106. The boot sequence 156 may also include communication control instructions 160 such as network instructions 162 and/or a TCP/IP stack 164, as described in connection with FIGS. 2 and 3. The non-volatile memory 252 may also contain a server address 166 and an ID parameter 170, which may be similar in function to those of the reader 102 of FIGS. 2 and 3. The operating system 276 may be stored in the non-volatile memory 152 and loaded into the volatile memory 154 when the reader 102 powers up.

In the reader 202 of FIG. 4, the operating instructions 104 may be stored in the non-volatile memory 252 as well. The operating instructions 104 may contain the general instructions 174, formatting instructions 178, image capture instructions 180, and/or decoder instructions 182 described in connection with FIG. 2. The operating instructions 104 may be received from the configuration server 106 and stored in storage which may be the volatile memory 154 or the non-volatile memory 152. The operating instructions 104 may then be copied into the volatile memory 254, at a physical location specified by the virtual memory manager 272.

Accordingly, the start address 198 need not be stored within the non-volatile memory 252 or the operating instructions 104. Rather, the physical start address may be selected by the virtual memory manager 272. The start address may, if desired, be selected to enable the reader 202 to read barcodes in conjunction with one or more other applications with data stored in the volatile memory 254 to enable them to run on the reader 202.

In some embodiments, the reader 202 may be powered up and the boot sequence 156 may then be executed to fetch the operating instructions 104 from the configuration server 106. The non-volatile memory 252 may still have the operating instructions 104 that were fetched during the previous execution of the boot sequence 156. These may be overwritten by the new instance of the operating instructions 104, which may then be copied into the volatile memory 256 for execution. In this manner, each time the reader 202 powers up, the operating instructions 104 may be refreshed. The boot sequence 156 may provide the address space (for example, the start address) in the non-volatile memory 252 to which the operating instructions 104 are to be copied.

Alternatively or additionally, the new operating instructions 104 may be copied into a different location in the non-volatile memory 252 from that occupied by the old operating instructions 104 so that both sets of operating instructions 104 can be maintained simultaneously on the non-volatile memory 252. The boot sequence 156 may then include instructions to determine which instance of the operating instructions 104 should be used. It may be advantageous to use the new instance of the operating instructions 104 for reasons set forth above; however, it may also be advantageous to provide the reader 202 with a method of verifying the new operating instructions 104 so that, if the new operating instructions 104 are incomplete, non-functional, and/or show evidence of tampering, the old operating instructions 104 can instead be used.

In either case, the boot sequence 156 may optionally include instructions (not shown) that make the reader 202 incapable of performing certain functions controlled by the limited operating instructions until the operating instructions 104 have been received and executed. These operating instructions 104 may only be required to carry out certain functions of the reader 202, and may thus be "supplemental operating instructions," as described previously. In some embodiments, the reader 202 may be incapable of reading barcodes, decoding barcodes, formatting decoded barcode data, and/or transmitting decoded barcode data to the remote computing system until the operating instructions 104 have been received, stored, and executed.

In some embodiments, the operating instructions 104 may not be fetched until a configuration event distinct from power-up of the reader 102 occurs. For example, the reader 202 may be powered up, and the operating system 276 may be loaded into the volatile memory 254 and executed. If limited operating instructions are used to enable some barcode reading functions, these may also be loaded into the volatile memory 254 and executed. However, the supplemental operating instructions (i.e., the operating instructions 104) may not be fetched from the configuration server 106 until a configuration event is detected, for example, by the operating system 276 or the limited operating instructions. Such a configuration even may include an attempt by the user to read a barcode, decode a barcode, format decoded barcode data, and/or transmit decoded barcode data. Alternatively or additionally, such a configuration event may be detection of communications between the reader 202 and an insecure or unverified computing device, receipt of a push notification from the configuration server 106 (for example, notification of the availability of a new version of the operating instructions 104), passage of a predetermined period of time, the capture of a predetermined quantity of barcodes, or the like.

Once the configuration event is detected, the operating instructions 104 may be fetched from the remote configuration server, copied into the volatile memory 254, and executed. In some embodiments, detection of such a configuration event may cause the reader 202 to cease any barcode reading functionality before the operating instructions 104 are obtained. For example, if the limited operating instructions provide the ability to read barcodes, detection of a configuration event may prevent further barcodes from being read until the operating instructions 104 have been received, stored, and executed. If the limited operating instructions provide the ability to transmit decoded barcode data, such transmission may be stopped upon detection of a configuration event, until the operating instructions 104 have been received, stored, and executed.

Figure 5:
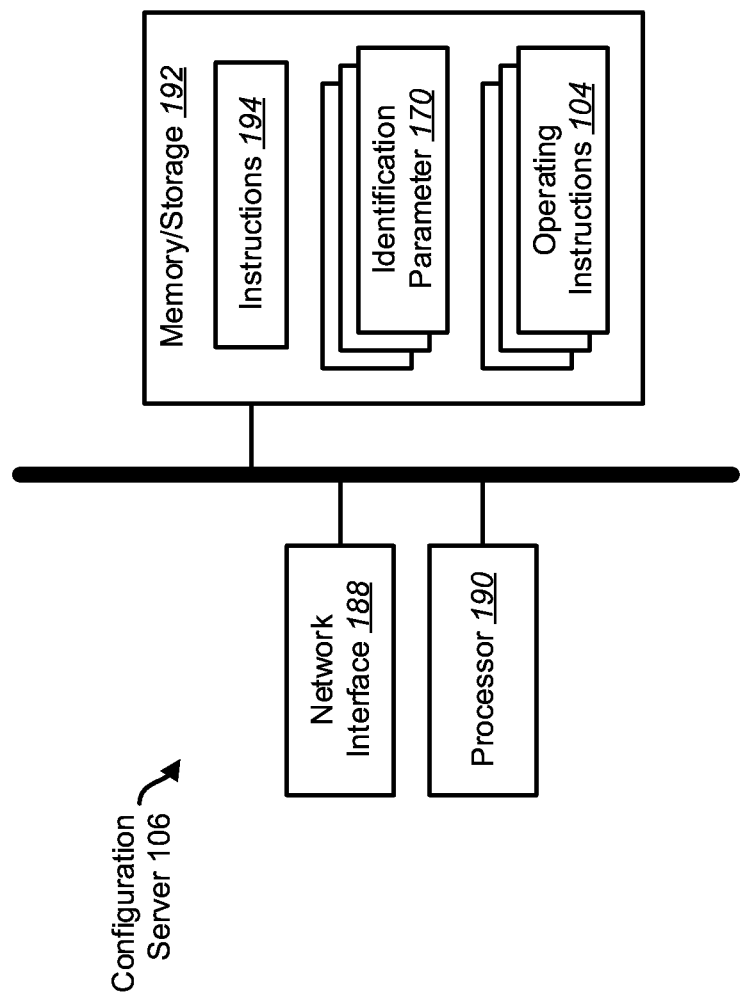
FIG. 5 illustrates some aspects of an embodiment of a configuration server in the system shown in FIG. 1.

FIG. 5 illustrates some aspects of an embodiment of a configuration server 106 (either the local configuration server 106a or the remote configuration server 106b). The configuration server 106 includes a network interface 188. The network interface 188 may enable the local configuration server 106a to be identified as an addressable endpoint on a LAN, either the LAN 112 in the system 100 shown in FIG. 1 (e.g., if the configuration server 106 is a local configuration server 106a) or another LAN that is connected to the Internet 124 (e.g., if the configuration server 106 is a remote configuration server 106b).

Figure 8:
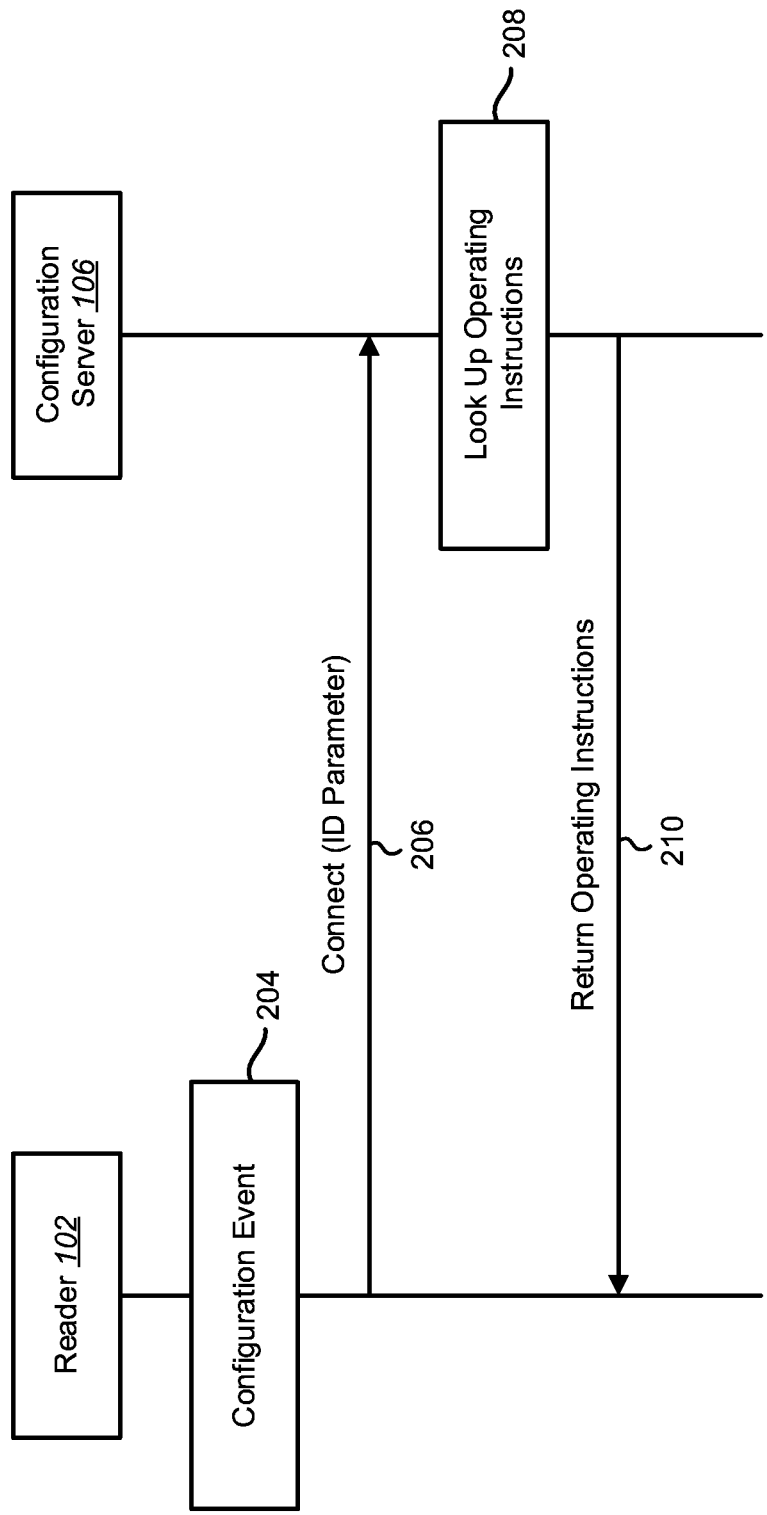
FIG. 8 illustrates exemplary operation of an embodiment of a barcode reader and a configuration server in the system shown in FIG. 1.
Figure 9:
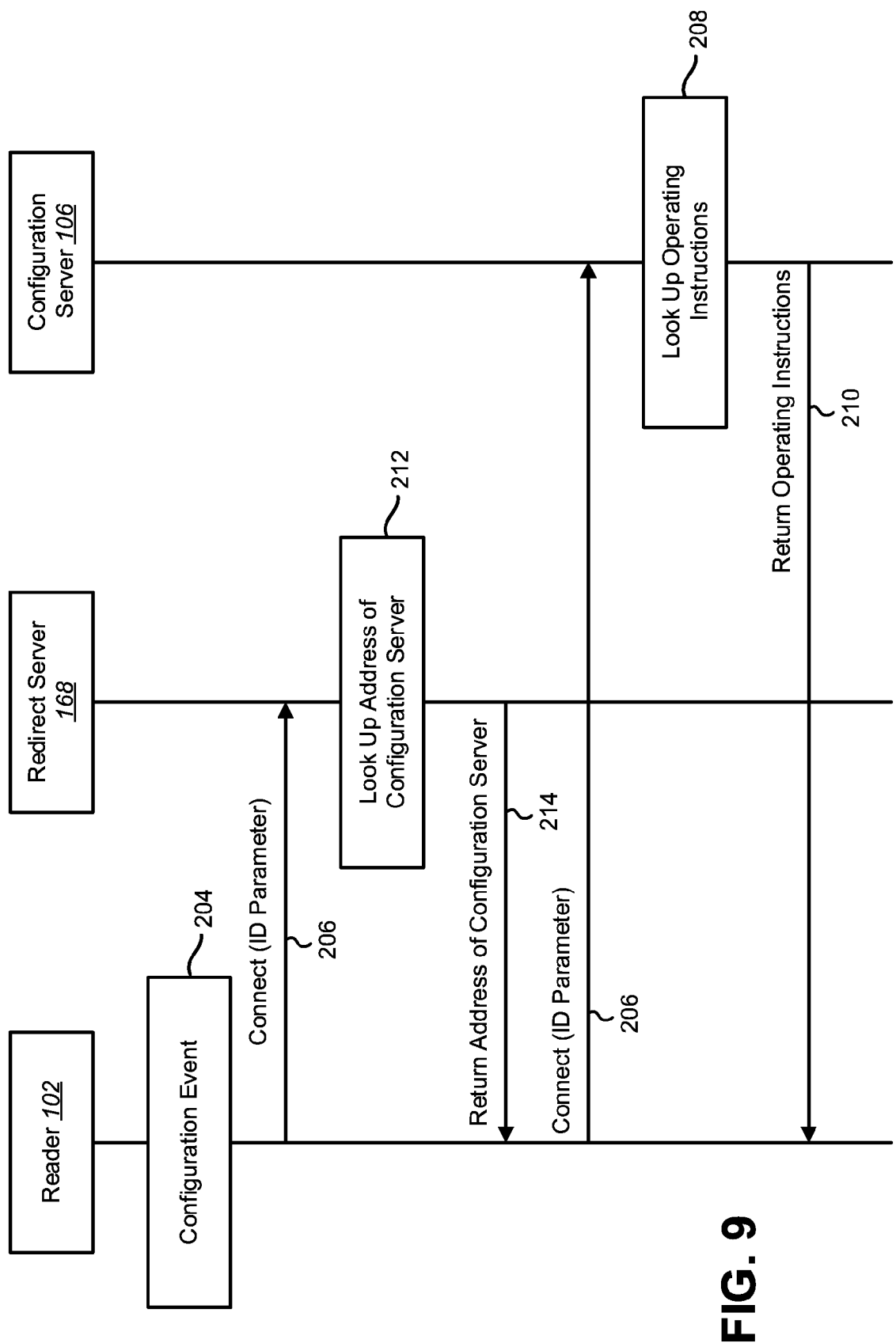
FIG. 9 illustrates exemplary operation of an embodiment of a barcode reader, a redirect server and a configuration server in the system shown in FIG. 1.
Figure 10:
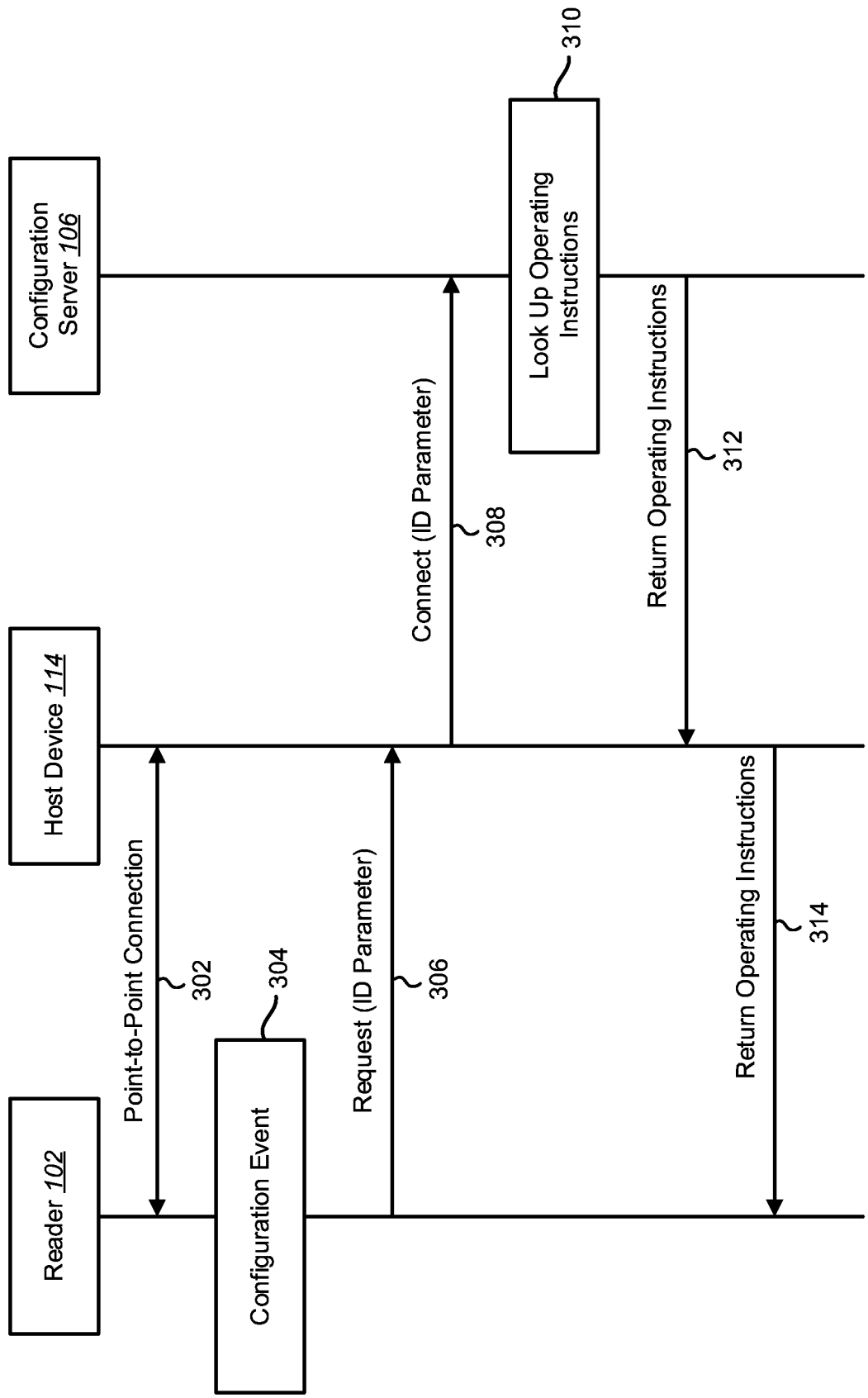
FIG. 10 illustrates exemplary operation of an embodiment of a barcode reader, a host device and a configuration server in the system shown in FIG. 1.

The configuration server 106 also includes a processor 190 and memory/storage 192 in electronic communication with the processor 190. Instructions 194 are stored in the memory/ storage 192. The instructions 194 are executable by the processor 190 to cause the configuration server 106 to perform some or all of the operations that are shown in FIGS. 8, 9, 10 and/or 11 and that will be described in connection therewith.

The memory/storage 192 of the configuration server 106 may also include one or more sets of operating instructions 104, as well as one or more identification parameters, or ID parameters 170. Each ID parameter 170 may be associated with one or more sets of operating instructions 104. As will be described in greater detail below, when the configuration server 106 receives an ID parameter 170, the configuration server 106 may identify the operating instructions 104 that correspond to (or are associated with) the ID parameter 170 and return those operating instructions 104 to the requesting entity. The operating instructions 104 that are appropriate for each reader 102 or reader 202 may depend on the operating requirements of the reader 102 or 202.

According to one example, multiple sets of operating instructions 104 may be provided in order to satisfy different requirements for formatting the data decoded by the reader 102 or the reader 202. For example, a retail outlet and a shipping company may both utilize barcodes that can be supplied with operating instructions 104 according to the invention. However, the shipping company may encode different data in its barcodes than that encoded by the retail outlet; hence, they may need different sets of operating instructions 104 in order to provide the necessary formatting of the decoded data. Similarly, multiple sets of operating instructions 104 may be needed to provide different decoder functions that match the barcode encoding schemes and/or encoding formats of each company, thereby enabling decoding to be properly carried out by each of the readers 102.

According to another example, multiple sets of operating instructions 104 may be provided in order to enable decoded data to be routed differently. Returning to the example of the shipping company and the retail outlet, the retail outlet may route decoded data to a host computer 114a connected to the corresponding reader 102, while the shipping company may route data to a server located remotely from the reader 102. Thus, different sets of operating instructions 104 may be needed in order to provide the required routing of the decoded data.

According to another example, multiple sets of operating instructions 104 may be provided in order to satisfy differing hardware requirements. For example, different readers 102, 202 may have different hardware components such as the illumination system 130, the imaging system 132, the input control 138, trigger switch 142, keypad 144, touch panel 145, display 140, wireless LAN interface 108a, and/or the point-to-point interface 108b. Each set of operating instructions 104 may have the drivers and/or other software needed to control the operation of its various hardware components. Thus, readers 102, 202 with different imaging systems 132 may have different sets of operating instructions 104. As set forth previously, each set of operating instructions may be associated with the ID parameter 170, which may be used to select the operating instructions 104 needed to properly operate the hardware of the reader 102, 202.

The ID parameter 170 may have numbers, letters, or other indicators that are associated with particular readers 102, 202, particular hardware components of readers 102, 202 as set forth above, particular encoding formats in which barcodes are encoded, particular data formats in which the decoded data are to be provided, particular barcode types that are to be read with the reader 102, 202, and/or the like. If desired, the ID parameter 170 may include multiple such identifiers, and may thus directly indicate multiple aspects of the configuration and/or operation of the associated reader 102, 202. Alternatively, the ID parameter 170 may instead be arbitrary, and the configuration server 106 may use a lookup table or other database function to determine the appropriate operating instructions 104 for the reader 102, 202 from multiple sets of operating instructions 104 stored on the configuration server 106.

Figure 6:
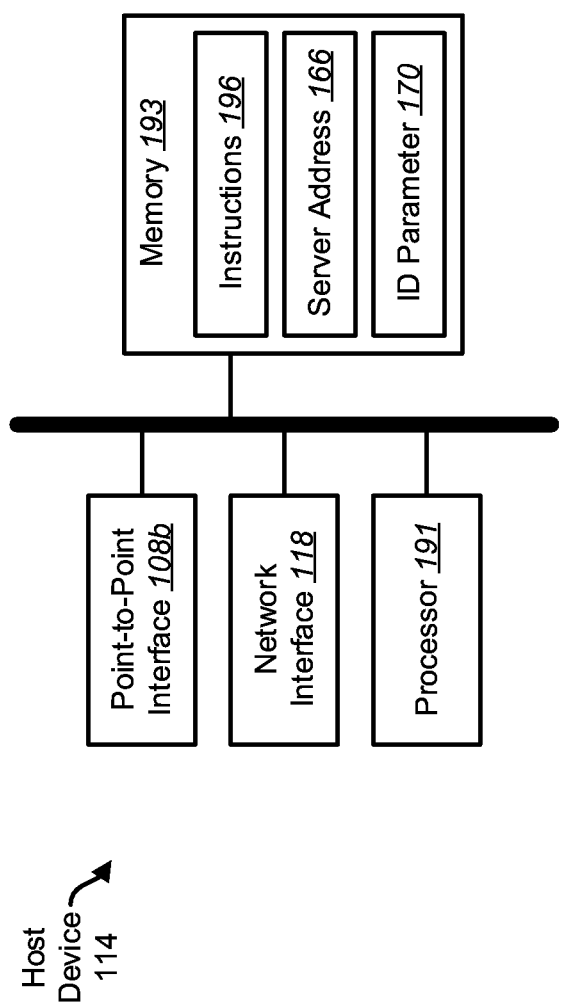
FIG. 6 illustrates some aspects of an embodiment of a host device in the system shown in FIG. 1.

FIG. 6 illustrates some aspects of an embodiment of a host device 114 (either the host computer 114a or the mobile host 114b). The host device 114 includes a point-to-point interface 108b. The host device 114 also includes a network interface 118. The network interface 118 may be a wireless LAN interface 118a (e.g., if the host device 114 is a host computer 114a that is an addressable endpoint on the LAN 112) or a wireless WAN interface 118b (e.g., if the host device 114 is a mobile host 114b).

The host device 114 also includes a processor 191 and memory 193 in electronic communication with the processor 191. Instructions 196 are stored in the memory 193. The instructions 196 are executable by the processor 191 to cause the host device 114 to perform some or all of the operations that are shown in FIGS. 10 and/or 11 and that will be described in connection therewith.

As indicated above, the reader 102 may store the server address 166 and the ID parameter 170 in non-volatile memory 152. Alternatively or additionally, the server address 166 and the ID parameter 170 may be stored by the host device 114 instead of (or in addition to) the reader 102. The host device 114 may use the server address 166 to connect to a remote server, either a configuration server 106 or a redirect server 168. The host device 114 may use the ID parameter 170 to request operating instructions 104 from the configuration server 106.

Figure 7:
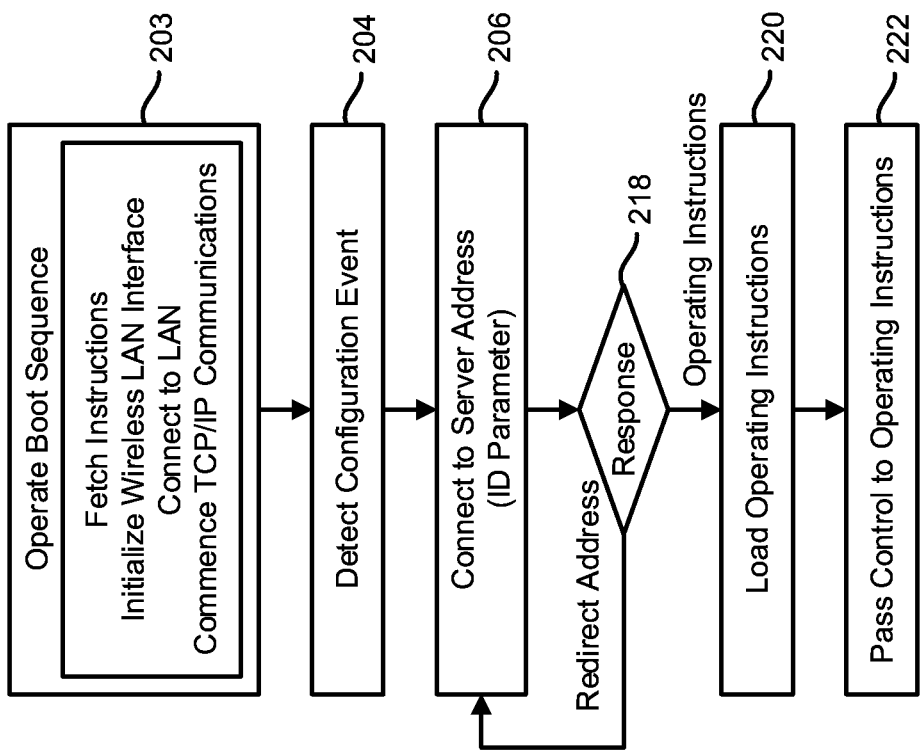
FIG. 7 illustrates exemplary operation of an embodiment of a barcode reader in the system shown in FIG. 1.

FIG. 7 illustrates exemplary operation of the reader 102, as described in connection with FIG. 2 or FIG. 3 and/or operation of the reader 202 as described in connection with FIG. 4. FIG. 8 illustrates exemplary operation of the reader 102 as described in connection with FIG. 2 or FIG. 3 and/or the reader 202 as described in connection with FIG. 4, and a configuration server 106. FIGS. 7 and 8 both relate to a scenario in which the reader 102 includes a wireless LAN interface 108a and obtains operating instructions 104 via its network connection to the configuration server 106.

Step 203 of FIG. 7 represents operating the boot sequence 156. Operating the boot sequence 156 may include loading the fetch instructions 158 from the non-volatile memory 152 to the volatile memory 154. In an embodiment in which the reader 102 includes a wireless LAN interface 108a, operating the boot sequence 156 may also include initializing the wireless LAN interface 108a, connecting to the LAN 112, and commencing TCP/IP communications.

Step 204 (shown in both FIGS. 7 and 8) represents detecting the occurrence of a configuration event, which can be any event that is defined to require the reader 102 to obtain operating instructions 104. The Boot up may be a configuration event. In addition to boot up, configuration events may be defined based on certain times, certain locations, changing users, an event being sent down from a server such as the configuration server 106, etc. A list of such configuration events (not shown) may be stored, for example, in the non-volatile memory 152 and/or the non-volatile memory 252. Alternatively or additionally, executable code (not shown) that causes the processor 148 or the processor 248 to continuously or periodically check for the occurrence of such a configuration event and then, in response, initiate fetching of the operating instructions 104 from the remote configuration server 106*b*, may be stored in the non-volatile memory 152 and/or the non-volatile memory 252.

Step 206 may be performed in response to detecting the configuration event. Step 206 represents the reader 102 obtaining the ID parameter 170 from the non-volatile memory 152, connecting to a remote server (either a configuration server 106 or a redirect server 168) located at the server address 166, and providing the ID parameter 170 to the remote server via the network connection. The reader 102 may utilize the wireless LAN interface 108*a* to connect to the remote server and to provide the ID parameter 170 to the remote server.

Referring to FIG. 8, if the server at the server address 166 is a configuration server 106 that provides the operating instructions 104, step 208 represents the configuration server 106 identifying the operating instructions 104 that are associated with the ID parameter 170, and step 210 represents returning the operating instructions 104 to the reader 102.

Alternatively, referring to FIG. 9, if the server at the server address 166 is not itself a configuration server 106 that provides the operating instructions 104 but instead is a redirect server 168 that identifies to the reader 102 an address for a configuration server 106, step 206 represents the reader 102 connecting to the redirect server 168 and providing the ID parameter 170 to the redirect server 168. Step 212 represents the redirect server 168 looking up the address (e.g., the URL) of a configuration server 106 that will support the reader 102. This may include using the ID parameter 170 sent by the reader 102 to look up the address of a particular configuration server 106 that can support the reader 102. Step 214 represents the redirect server 168 returning the address of the configuration server 106 (which may be referred to as a redirect address) to the reader 102.

Step 218 (FIG. 7) represents the reader 102 obtaining a response to the connection it established at step 206. This response may include either the operating instructions 104 from a configuration server 106 or a redirect address from a redirect server 168. In the event a redirect address is obtained, the reader 102 repeats step 206 but with the connection being to the redirect address provided by the redirect server 168.

When, at step 218, operating instructions 104 are received, the operating instructions 104 may be loaded into volatile memory 154 at step 220. At step 222, control may be passed to the operating instructions 104 at an appropriate time. For example, control may be passed to the operating instructions 104 when calling the decoder instructions 182 to attempt decode of an image or when calling the formatting instructions 178 for processing of decoded data.

Although FIG. 9 depicts the redirect server 168 providing the address of the configuration server 106 such that the loop-back and repeat of steps 206, 218 (FIG. 7) occurs only once, it should be appreciated that the loop-back could occur multiple times if a first redirect server 168 provides an address of a second redirect server 168, which in turn may provide an address of a third redirect server 168 or a configuration server 106. The architecture described does not limit how many redirects are made before the reader 102 reaches a configuration server 106 capable of providing the operating instructions 104.

If the communication interface 108 is a point-to-point interface 108*b* (wired or wireless), the reader 102 may obtain network access through the point-to-point interface 108*b* with the corresponding host device 114 functioning as a network gateway for the reader 102. Operation of the reader 102 is very similar to the operation discussed with respect to the wireless LAN interface 108*a*, with the difference being that the point-to-point interface 108*b* is used instead of the wireless LAN interface 108*a*.

When a point-to-point connection 116 is used to obtain the operating instructions 104 for the reader 102, the reader 102 does not necessarily need to know how to contact the server (configuration server 106 or redirect server 168) to obtain the operating instructions 104. The host device 114 to which the reader 102 is connected (e.g., the host computer 114*a* or the mobile host 114*b*) may perform the steps necessary to obtain the operating instructions 104 for the reader 102. More specifically the host device 114, not the reader 102, may be the addressable network endpoint on the LAN 112 and may perform all TCP/IP communications. The server address 166 and the ID parameter 170 may be stored locally on the host device 114 (as shown in FIG. 6), or an application running on the host device 114 may obtain these from the reader 102.

FIG. 10 illustrates exemplary operation of the reader 102 and a host device 114 (e.g., the host computer 114*a* or the mobile host 114*b*) in a scenario in which the reader 102 includes a point-to-point interface 108*b* and obtains operating instructions 104 via a point-to-point connection 116 to a host device 114, where the host device 114 communicates with the configuration server 106 via a network.

Step 302 represents the reader 102 establishing a point-to-point connection 116 with a host device 114 via the point-to-point interfaces 108*b*. Step 304 represents detecting the occurrence of a configuration event.

Step 306 may be performed in response to detecting the configuration event. Step 306 represents the reader 102 sending a message to the host device 114 via the point-to-point connection 116. The message may include a request to obtain operating instructions 104 for the reader 102. The request may enable the host device 114 to determine that the reader 102 is in a state in which the reader 102 requires the operating instructions 104. Receiving the request may entail determining that the reader 102 lacks the operating instructions 104, as when the operating instructions are only stored within the volatile memory 154 of the reader 102 and the configuration event is powering up of the reader 102 with no operating instructions 104 in the volatile memory 154 or in the non-volatile memory 152. Alternatively or additionally, receiving the request may mean that the operating instructions 104 are present in the reader 102, but are out-of-date, potentially compromised, or otherwise in need of replacement. Conversely, receiving decoded barcode data from the reader 102 and/or receiving an associated configuration parameter may entail determining that the reader 102 has the required operating instructions 104.

As part of the request, the reader 102 may obtain the ID parameter 170 from the non-volatile memory 152 and provide the ID parameter 170 to the host device 114. The reader 102 may utilize the point-to-point interface 108*b* to send the request and provide the ID parameter 170 to the host device 114 via the point-to-point connection 116. Alternatively, the ID parameter 170 may be stored by the host device 114, and the reader 102 may send the request to the host device 114 without sending the ID parameter 170.

Step 308 represents the host device 114 obtaining the server address 166 and using its network interface 118 to connect to a remote server (either a configuration server 106 or a redirect server 168) that is located at the server address 166. The server address 166 may be stored by the host device 114. Step 308 also represents the host device 114 providing the ID parameter 170 to the remote server.

If the server at the server address 166 is a configuration server 106 that provides the operating instructions 104, step 310 represents the configuration server 106 looking up the operating instructions 104 that correspond to the ID parameter 170, step 312 represents the configuration server 106 returning the operating instructions 104 to the host device 114, and step 314 represents the host device 114 returning the operating instructions 104 to the reader 102 via the point-to-point connection 116. The reader 102 may receive the operating instructions 104 via the point-to-point interface 108b. The reader 102 may then load the operating instructions 104 into the volatile memory 154 as set forth above, execute them, and transmit to the host device 114, over the point-to-point interface 108b, decoded barcode data from one or more barcodes within the field-of-view of the imaging system 132 of the reader 102.

Figure 11:
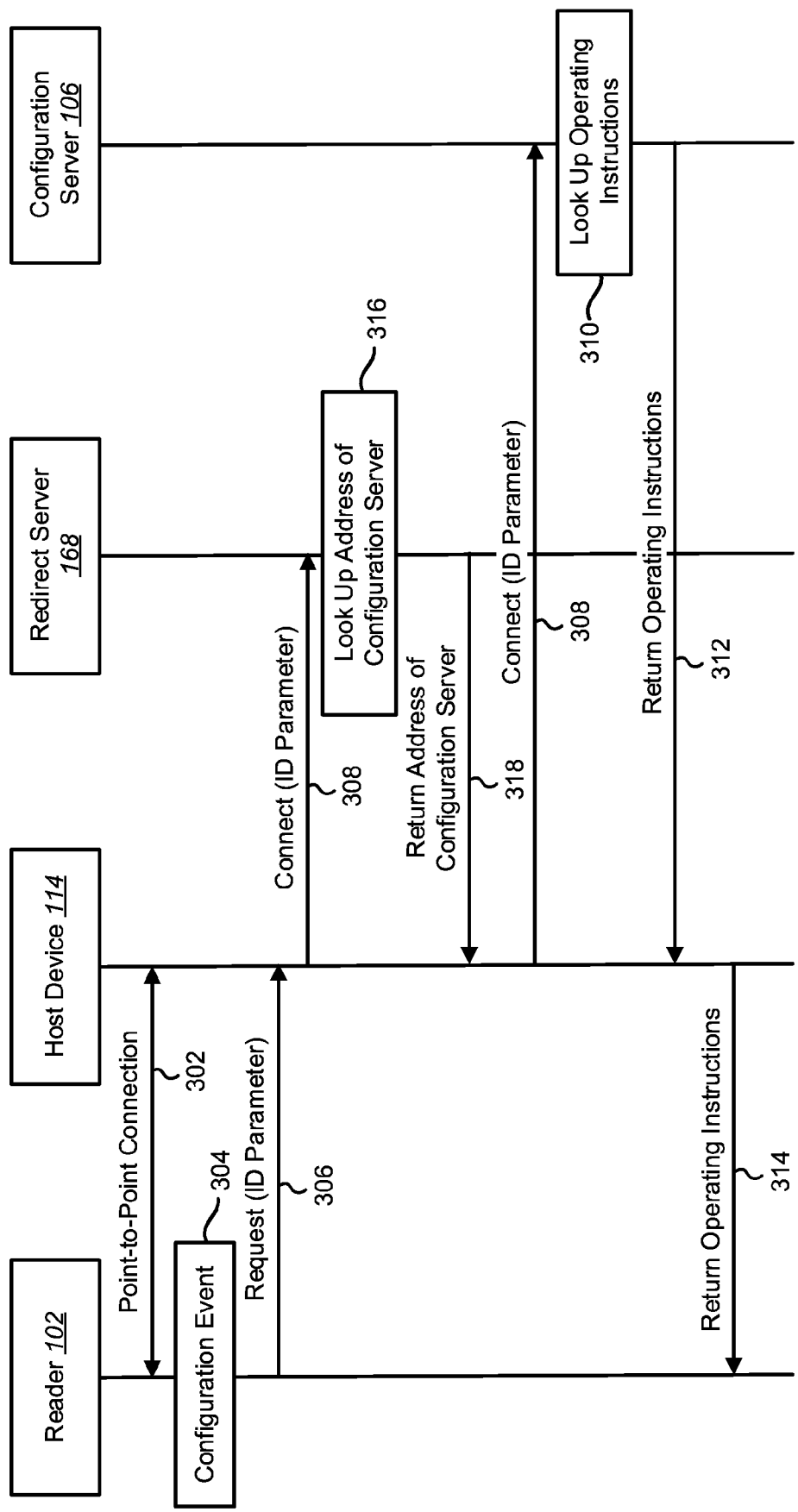
FIG. 11 illustrates exemplary operation of an embodiment of a barcode reader, a host device, a redirect server and a configuration server in the system shown in FIG. 1.

Alternatively, referring to FIG. 11, if the server at the server address 166 is not itself a configuration server 106 that provides the operating instructions 104 but instead is a redirect server 168, step 316 represents the redirect server 168 looking up the address for the configuration server 106 that will support the reader 102. This may include using the ID parameter 170 sent by the host device 114 to look up the address of a particular configuration server 106 that can support the reader 102. Step 318 represents returning the address of the configuration server 106 to the host device 114.

FIGS. 7-11 relate to methods carried out with a reader 102 like that of FIGS. 2 and 3. Usage of a reader 202 like that of FIG. 4 may be similar to that set forth above, with a few exceptions. For example, with a reader 202, the step 203 of FIG. 7 may include loading the operating system 276 into the volatile memory 254. This may be done, for example, when the reader 202 is booted up or powered on. If desired, this may be done immediately prior to the time the fetch instructions 158 are loaded into the volatile memory 254.

Further, as mentioned in the description of FIG. 4, the operating instructions 104 may optionally be copied to the non-volatile memory 252 after they have been obtained from the configuration server 106. The operating instructions 104 may then be copied into the appropriate physical location within the volatile memory 254 with the aid of the virtual memory manager 272. Thus, the step 220 of FIG. 7 may include one or more copying and/or loading steps.

After performance of the steps set forth in FIGS. 7-11, the reader 102, 202 may be ready for use in reading barcodes and transmitting the resulting decoded data to the remote computing system. This may be carried out through the use of the operating instructions 104, which may be used to control the reader 102, 202. Alternatively or additionally, code from the non-volatile memory 152, 252 may be used in the process of reading barcodes, decoding barcodes, and/or transmitting decoded data. According to one embodiment, the operating instructions 104 may be used to drive the process of reading the barcode, decoding the barcode data, and formatting the barcode data (for example, with the image capture instructions 180, the decoder instructions 182, and the formatting instructions 178, respectively), and then the communication control instructions 160 may be used to facilitate transmission of the decoded data to the remote computing system.

The operating instructions 104 may be programmed, compiled, and linked in such a manner that they function properly in the physical locations in which they reside in the volatile memory 154 of the reader 102 and/or the volatile memory 254 of the reader 202. This will be shown and described in connection with FIGS. 12-15, as follows.

Figure 12:
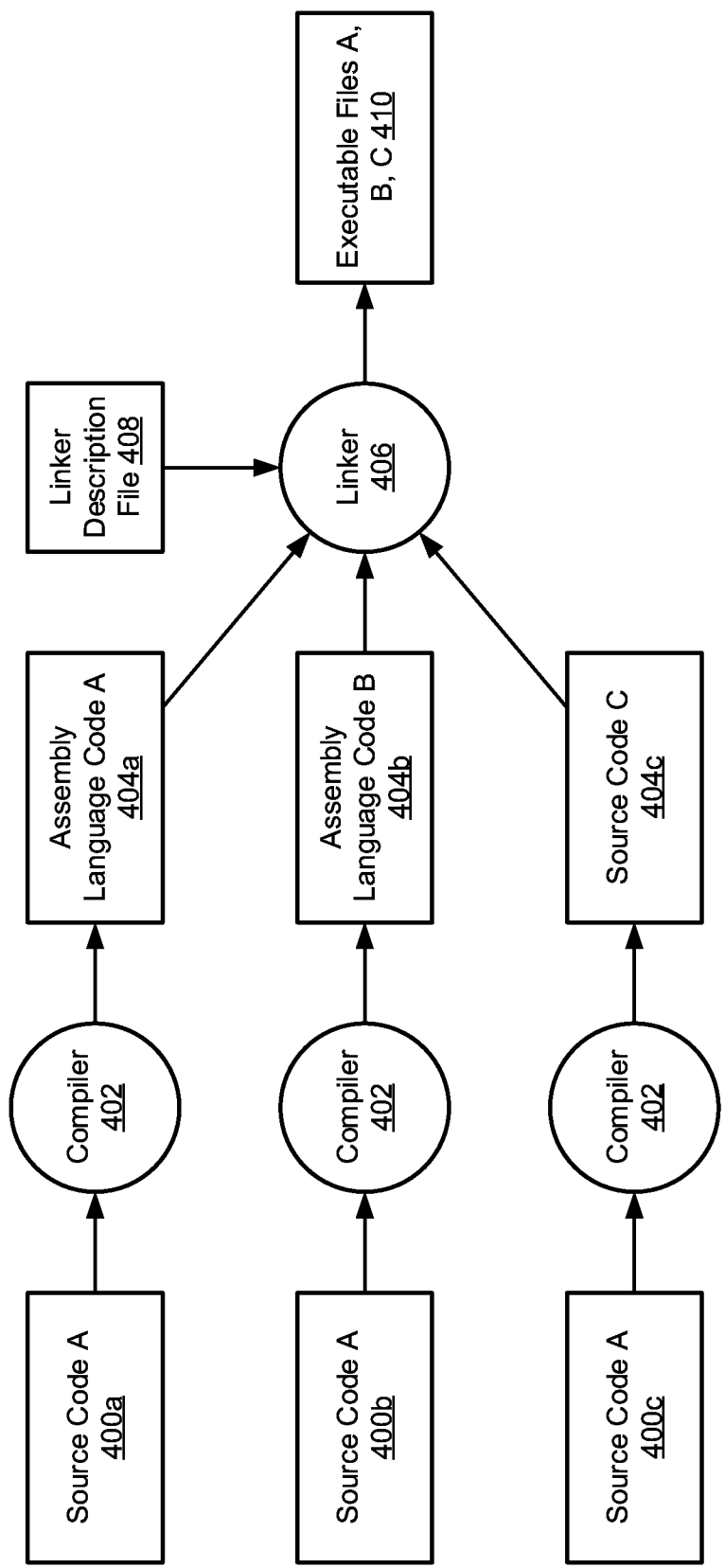
FIG. 12 illustrates an exemplary method of generating executable code according to the invention.

FIG. 12 illustrates an exemplary method for generating executable files 410 which may comprise operating instructions 104. The executable files 410 may be loaded into non-volatile memory (for example, within the memory/storage 192 of the configuration server 106). From the non-volatile memory, the executable files 410 may be loaded into volatile memory of the reader (after being provided to the reader) and executed therefrom, as set forth above the description of the reader 102 of FIGS. 2 and 3 and the reader 202 of FIG. 4. The method may commence with the generation of source code 400, for example, three components of the source code 400, labeled source code A 400a, source code B 400b, and source code C 400c.

Source code processing steps may be defined using text-based commands and named variables with syntax applicable to the programming language used (for example, C++, Java, etc.). A programmer working with text-based commands and named variables in source code may not specify such matters as the location within reader memory at which the executable code will be loaded, processor and memory locations for read/write commands, and memory locations at which variables and data are stored. Hence, the source code 400 may not include such information.

A compiler 402 may be used to compile each portion of the source code 400a, 400b, 400c to produce assembly language code 404, or more specifically, assembly language code A 404a, assembly language code B 404b, and assembly language code C 404c, respectively. Each of the assembly language codes 404 may implement the text-based commands of the corresponding source code 400 using sequences of memory read/write commands, mathematical computations, and/or Boolean logic computations for variable value and data management consistent with the commands within the corresponding source code 400. Each of the assembly language codes 404 may have certain functions that interact with functions of the other assembly language codes 404 for purposes of operation.

In order to generate the executable files 410, the assembly language code 404 may be linked using a linker 406, which may utilize a linker description file 408 to carry out the linking process. The linker description file 408 may describe locations within addressable memory to be assigned to portions of each assembly language code 404 and/or locations within addressable memory for variables and data. The linker 406 may use the linker description file 408 to build the executable file 410 with consistent memory addresses being associated with the various read/write commands, mathematical computations, and Boolean logic computations such that each memory address specified within the code appropriately links to the appropriate start of the intended processing steps or data values.

In one embodiment, the executable files 410 may include a RAM image such as the RAM image 186 of FIG. 2. Such a RAM image may be, for example, firmware for an embedded system device. The linker description file 408 may specify address locations within the hardware-specific physical memory of the embedded system device such that the RAM image, when loaded at the specified location (start address 198) within addressable physical memory, will execute.

Figure 13:
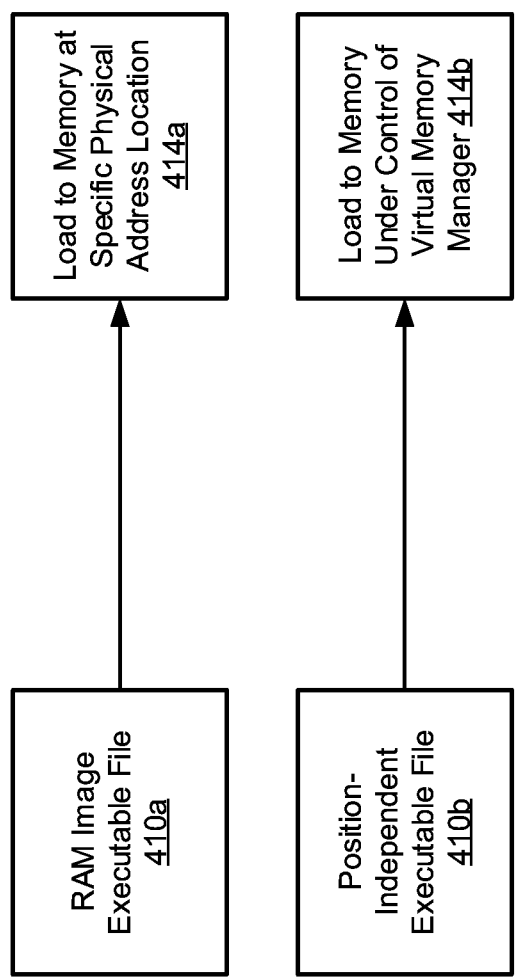
FIG. 13 illustrates how a different types of executable code produced via the method of FIG. 12 may be loaded into volatile memory for execution.

Referring to FIG. 13, exemplary steps are shown for loading executable files into volatile memory such as the volatile memory 154 of the reader 102 or the volatile memory 254 of the reader 202. In the example of FIG. 13, the executable files 410 may include position-dependent and position-independent executable files 410b.

The RAM image executable file 410a may be used in conjunction with an embedded system device, and may thus be suitable for the reader 102 of FIGS. 2 and 3. As shown in FIG. 13, the RAM image executable file 410a may be loaded into the memory (for example, into the volatile memory 154 of the reader 102) by loading it into a specific physical address location in the step 414a. This may, for example, be the start address 198 specified in the non-volatile memory 152 (FIG. 2) or the header 199 of the operating instructions (FIG. 3). To enable this functionality, the linker 406 may link the corresponding assembly language code 404a in a manner that enables the RAM image executable file 410a to execute properly when loaded into volatile memory in this manner.

Figure 14:
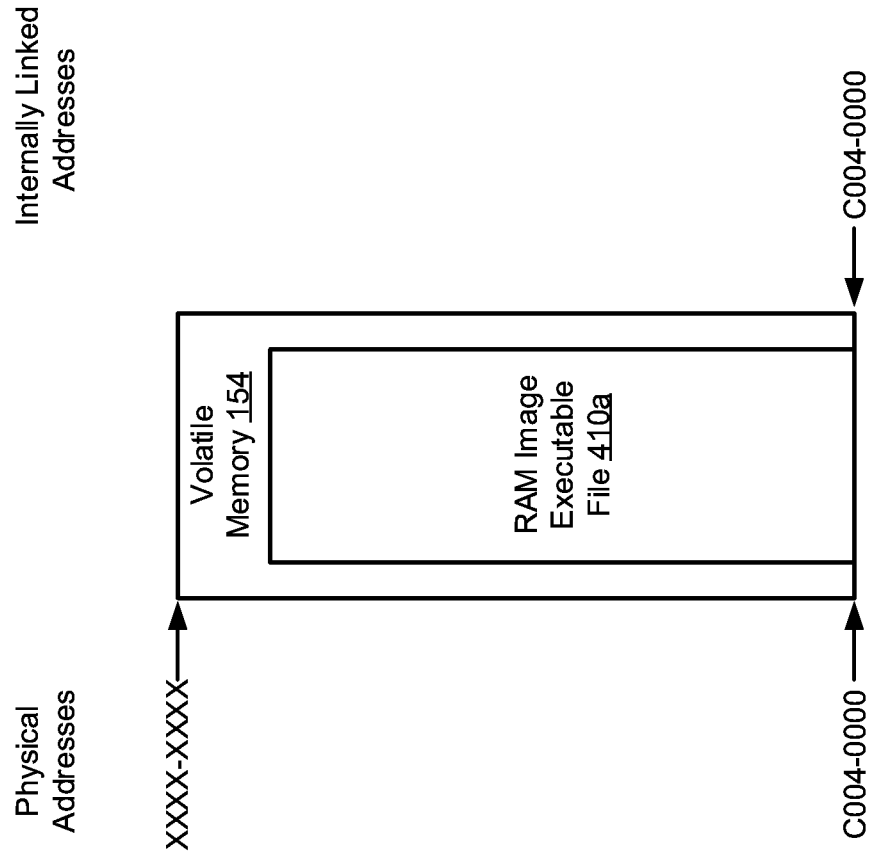
FIG. 14 illustrates a RAM image executable file residing in volatile memory after it has been loaded as set forth in FIG. 13.

This is represented by the block diagram of FIG. 14. The step 414a represents loading the RAM image executable file 410a into the volatile memory (for example, the volatile memory 154 of the reader 102) at the physical address space that aligns with the linked addresses within the RAM image executable file 410a, as shown in FIG. 14. Thus, a processor (such as the processor 148 of FIG. 2), when performing its read/write commands, mathematical computations, and/or Boolean logic computations per the instructions and memory addresses specified in the RAM image executable file 410a, will perform the programmed operations. If the RAM image executable file were loaded at any other address space other than in alignment with the linked addresses within the RAM image executable file 410a, the RAM image executable file 410a may not execute because, for example, when a memory address within the RAM image executable file 410a is specified for reading a particular variable, the variable would not be at the specified address.

Returning to FIG. 13, the position-independent executable file 410b may more suitable for devices with an operating system and/or a memory manager in which multiple executable files must be loaded into volatile memory for execution, such as the reader 202 of FIG. 4. Thus, as shown in FIG. 13, the position-independent executable file 410b may be loaded into the memory (for example, the volatile memory 254 of the reader 202) under the control of a memory manager, such as the virtual memory manager 272 of FIG. 4 in the step 414b. The virtual memory manager 272 may determine the optimal location for the position-independent executable file 410b within the volatile memory 254 based on what other executable files and/or data are residing in the volatile memory 254 at the time the position-independent executable file 410b is copied into the volatile memory 254.

To enable this functionality, the linker 406 may link the corresponding assembly language code (i.e., assembly language code B 404b) in a manner that enables the position-independent executable file 410b to execute properly when loaded into volatile memory in this manner. More precisely, the linker description file 408 may describe, for a position-independent executable such as the position-independent executable file 410b, reference locations within a reference block of memory addresses. This may include indicating "x bytes commencing at address C004-0000" or the like.

If the position-independent executable file 410b were loaded at a physical address space that aligned with the reference address space, the position-independent executable file 410b would execute. However, position-independent code is particularly useful when multiple executables, each of which reference the same address space, are required. A memory manager, such as the virtual memory manager 272, may enable the position-independent executable file 410b to be loaded at a physical memory location that is inconsistent with the linked addresses within the position-independent executable file 410b. The virtual memory manager 272 may maintain data descriptive of the differences between the reference memory addresses of the position-independent executable file 410b and the corresponding physical memory addresses at which the position-independent executable file 410b is loaded for execution.

Figure 15:
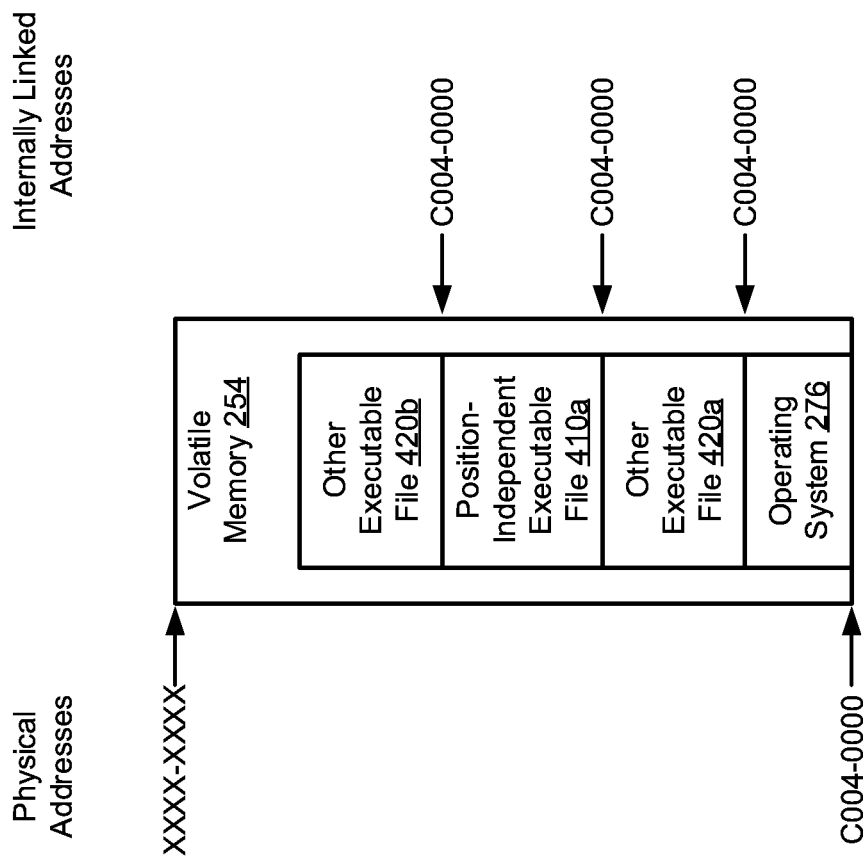
FIG. 15 illustrates a position-independent executable file residing in volatile memory along with other executable files after it has been loaded as set forth in FIG. 13.

This is represented by the block diagram of FIG. 15. The position-independent executable file 410b may be placed volatile memory, for example, in the volatile memory 254 of the reader 202 of FIG. 4, at a physical location different from that of its reference memory address. Other executable files 420a and 420b may also be loaded into the volatile memory 254, and may have the same reference memory addresses. The virtual memory manager 272 may enable them to coexist harmoniously in the volatile memory 254 by determining an appropriate offset between the reference memory addresses and the corresponding physical addresses, and placing them at different physical memory addresses according to the offsets.

As used herein, the terms "determining" and "obtaining" encompass a wide variety of actions and, therefore, "determining" and "obtaining" can include calculating, computing, processing, deriving, investigating, looking up (e.g., looking up in a table, a database or another data structure), ascertaining and the like. Also, "determining" and "obtaining" can include receiving (e.g., receiving information), accessing (e.g., accessing data in a memory) and the like. Also, "determining" and "obtaining" can include resolving, selecting, choosing, establishing and the like.

As used herein, the phrase "based on" does not mean "based only on," unless expressly specified otherwise. In other words, the phrase "based on" describes both "based only on" and "based at least on."

One or more of the features, functions, procedures, operations, components, elements, structures, etc., described in connection with any one of the configurations described herein may be combined with one or more of the functions, procedures, operations, components, elements, structures, etc., described in connection with any of the other configurations described herein, where compatible.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The claims are not limited to the specific implementations described above. Various modifications, changes and variations may be made in the arrangement, operation and details of the implementations described herein without departing from the scope of the claims.

What is claimed is:

1. A host device coupled to a barcode reader, the barcode reader comprising an image sensor for capturing an image of a barcode within a field of view of the barcode reader, the host device comprising:
   a point-to-point communication interface;
   a network interface;
   a processor;
   memory in electronic communication with the processor; and
   executable instructions stored in the memory, wherein the executable instructions include internal memory address references, including a start of execution address, configured such that the executable instructions will execute when loaded to physical memory at physical memory addresses which align with the internal memory address references, the start of execution address corresponding to a predetermined address at which the processor in the barcode reader is preconfigured to begin execution of the executable instructions, the executable instructions being executable by the processor upon boot-up to:

establish a point-to-point connection with the barcode reader via the point-to-point communication interface;

determine that the barcode reader is in a state wherein executable instructions necessary for providing, to the host device, data decoded from the barcode within the field of view of the barcode reader are not present within memory of the barcode reader, wherein determining that the barcode reader is in the state wherein the executable instructions necessary for providing the decoded data to the host device are not present within the memory of the barcode reader include obtaining an identification parameter from the barcode reader;

use the network interface to connect to a configuration server and to receive, from the configuration server, executable instructions required for the barcode reader to be capable of providing, to the host device, the data decoded from the barcode within the field of view of the barcode reader, wherein using the network interface to receive the executable instructions from the configuration server comprises providing the identification parameter to the configuration server, the executable instructions being selected from multiple distinct versions of executable instructions based on requirements for operating the barcode reader which are associated with the identification parameter;

provide the executable instructions to the barcode reader via the point-to-point point connection; and receive from the barcode reader, via the point-to-point communication interface, the data decoded from the barcode within the field of view of the barcode reader only after the executable instructions have been loaded to volatile memory of the barcode reader.

2. The barcode reader of claim 1, wherein the executable instructions include:
   internal memory address references configured such that the executable instructions will execute when loaded to physical memory at physical memory addresses which align with the internal memory address references; and
   a header including a physical memory address specification specifying the physical memory addresses which align with the internal memory address references such that the barcode reader reads the physical memory address specification from the header and loads the executable instructions to the physical memory addresses which align with the internal memory address references.

3. The barcode reader of claim 1, wherein the executable instructions include decoder instructions necessary for generating the data decoded from the image of the barcode captured by the image sensor.

4. The barcode reader of claim 3, wherein the executable instructions include internal memory address references, including a start of execution address, configured such that the executable instructions will execute when loaded to physical memory at physical memory addresses which align with the internal memory address references, the start of execution address corresponding to a predetermined address at which a processor in the barcode reader is preconfigured to begin execution of the executable instructions.

5. The barcode reader of claim 3, wherein the executable instructions include:
   internal memory address references configured such that the executable instructions will execute when loaded to physical memory at physical memory addresses which align with the internal memory address references; and
   a header including a physical memory address specification specifying the physical memory addresses which align with the internal memory references such that the barcode reader reads the physical memory address specification from the header and loads the executable instructions to the physical memory addresses which align with the internal memory address references.

6. The barcode reader of claim 3, wherein the executable instructions include instructions necessary for driving the image sensor to capture the image of the barcode within the field of view of the barcode reader.

7. The barcode reader of claim 6, wherein the executable instructions include internal memory address references, including a start of execution address, configured such that the executable instructions will execute when loaded to physical memory at physical memory addresses which align with the internal memory address references, the start of execution address corresponding to a predetermined address at which a processor in the barcode reader is preconfigured to begin execution of the executable instructions.

8. The barcode reader of claim 6, wherein the executable instructions include:
   internal memory address references configured such that the executable instructions will execute when loaded to physical memory at physical memory addresses which align with the internal memory address references; and
   a header including a physical memory address specification specifying the physical memory addresses which align with the internal memory references such that the barcode reader reads the physical memory address specification from the header and loads the executable instructions to the physical memory addresses which align with the internal memory address references.

9. A host device coupled to a barcode reader, the barcode reader comprising an image sensor for capturing an image of a barcode within a field of view of the barcode reader, the host device comprising:
   a point-to-point communication interface;
   a network interface;
   a processor;
   memory in electronic communication with the processor; and
   executable instructions stored in the memory, wherein the executable instructions include internal memory address references, including a start of execution address, configured such that the executable instructions will execute when loaded to physical memory at physical memory addresses which align with the internal memory address references, the start of execution address corresponding to a predetermined address at which the processor in the barcode reader is preconfigured to begin execution of the executable instructions, the executable instructions being executable by the processor upon boot-up to:
   establish a point-to-point connection with the barcode reader via the point-to-point point communication interface;
   when the barcode reader is in a state wherein executable instructions necessary for the barcode reader to be capable of providing, to the host device, data decoded from the barcode within the field of view of the barcode reader are not present within memory of the barcode reader:

use the network interface to connect to a configuration server;

receive, from the configuration server, the executable instructions necessary for the barcode reader to be capable of providing, to the host device, the data decoded from the barcode within the field of view of the barcode reader; and provide the executable instructions to the barcode reader via the point-to-point connection;

when the barcode reader is in a state wherein the executable instructions necessary for the barcode reader to be capable of providing, to the host device, the data decoded from the barcode within the field of view of the barcode reader, are present within the memory of the barcode reader: receive from the barcode reader, via the point-to-point interface, the decoded data from the barcode within the field of view of the barcode reader; and determine, based on information provided by the barcode reader via the point-to-point communication interface, whether the barcode reader is:

in the state wherein the executable instructions necessary for the barcode reader to be capable of providing, to the host device, the data decoded from the barcode within the field of view of the barcode reader are not present within the memory of the barcode reader; and in the state wherein the executable instructions necessary for the barcode reader to be capable of providing, to the host device, the data decoded from the barcode within the field of view of the barcode reader, are present within the memory of the barcode reader;

wherein the information provided by the barcode reader includes a configuration parameter when the barcode reader is in the state wherein the executable instructions necessary for the barcode reader to be capable of providing, to the host device, the data decoded from the barcode within the field of view of the barcode reader, are present within the memory of the barcode reader; and wherein receiving, from the configuration server, the executable instructions necessary for the barcode reader to be capable of providing, to the host device, the data decoded from the barcode within the field of view of the barcode reader comprises providing the configuration parameter to the configuration server, the executable instructions being selected from multiple distinct versions of executable instructions based on requirements for operating the barcode reader which are associated with the configuration parameter.

10. The barcode reader of claim 9, wherein the executable instructions include:

internal memory address references configured such that the executable instructions will execute when loaded to physical memory at physical memory addresses which align with the internal memory address references; and a header including a physical memory address specification specifying the physical memory addresses which align with the internal memory references such that the barcode reader reads the physical memory address specification from the header and loads the executable instructions to the physical memory addresses which align with the internal memory address references.

11. The barcode reader of claim 9, wherein the executable instructions include decoder instructions necessary for generating the data decoded from the image of the barcode captured by the image sensor.

12. The barcode reader of claim 11, wherein the executable instructions include internal memory address references, including a start of execution address, configured such that the executable instructions will execute when loaded to physical memory at physical memory addresses which align with the internal memory address references, the start of execution address corresponding to a predetermined address at which a processor in the barcode reader is preconfigured to begin execution of the executable instructions.

13. The barcode reader of claim 11, wherein the executable instructions include:

internal memory address references configured such that the executable instructions will execute when loaded to physical memory at physical memory addresses which align with the internal memory address references; and a header including a physical memory address specification specifying the physical memory addresses which align with the internal memory references such that the barcode reader reads the physical memory address specification from the header and loads the executable instructions to the physical memory addresses which align with the internal memory address references.

14. The barcode reader of claim 11, wherein the executable instructions include instructions necessary for driving the image sensor to capture the image of the barcode within the field of view of the barcode reader.

15. The barcode reader of claim 14, wherein the executable instructions include internal memory address references, including a start of execution address, configured such that the executable instructions will execute when loaded to physical memory at physical memory addresses which align with the internal memory address references, the start of execution address corresponding to a predetermined address at which a processor in the barcode reader is preconfigured to begin execution of the executable instructions.

16. The barcode reader of claim 14, wherein the executable instructions include:

internal memory address references configured such that the executable instructions will execute when loaded to physical memory at physical memory addresses which align with the internal memory address references; and a header including a physical memory address specification specifying the physical memory addresses which align with the internal memory references such that the barcode reader reads the physical memory address specification from the header and loads the executable instructions to physical memory addresses which align with the internal memory address references.

17. A host device coupled to a barcode reader, the barcode reader comprising an image sensor for capturing an image of a barcode within a field of view of the barcode reader, the host device comprising:

a point-to-point communication interface;

a processor;

memory in electronic communication with the processor; and executable instructions stored in the memory, wherein the executable instructions include internal memory address references, including a start of execution address, configured such that the executable instructions will execute when loaded to physical memory at physical memory addresses which align with the internal memory address references, the start of execution address corresponding to a predetermined address at which the processor in the barcode reader is preconfigured to begin execution of the executable instructions, the executable instructions being executable by the processor upon boot-up to:

establish a point-to-point connection with the barcode reader via the point-to-point communication interface;

provide executable instructions required for the barcode reader to be capable of providing, to the host device, data decoded from the barcode within the field of view of the barcode reader; and receive from the barcode reader, via the point-to-point communication interface, the decoded data from the barcode within the field of view of the barcode reader only after the executable instructions: i) have been provided to the barcode reader by the host device; ii) are loaded to volatile memory of the barcode reader; and iii) are being executed by a processor of the barcode reader.

18. The barcode reader of claim 17, wherein the executable instructions include:

internal memory address references configured such that the executable instructions will execute when loaded to physical memory at physical memory addresses which align with the internal memory address references; and a header including a physical memory address specification specifying the physical memory addresses which align with the internal memory references such that the barcode reader reads the physical memory address specification from the header and loads the executable instructions to the physical memory addresses which align with the internal memory address references.

19. The barcode reader of claim 17, wherein the executable instructions include decoder instructions necessary for generating the data decoded from the image of the barcode captured by the image sensor.

20. The barcode reader of claim 19, wherein the executable instructions include internal memory address references, including a start of execution address, configured such that the executable instructions will execute when loaded to physical memory at physical memory addresses which align with the internal memory address references, the start of execution address corresponding to a predetermined address at which a processor in the barcode reader is preconfigured to begin execution of the executable instructions.

21. The barcode reader of claim 19, wherein the executable instructions include:

internal memory address references configured such that the executable instructions will execute when loaded to physical memory at physical memory addresses which align with the internal memory address references; and a header including a physical memory address specification specifying the physical memory addresses which align with the internal memory references such that the barcode reader reads the physical memory address specification from the header and loads the executable instructions to the physical memory addresses which align with the internal memory address references.

22. The barcode reader of claim 19, wherein the executable instructions include instructions necessary for driving the image sensor to capture the image of the barcode within the field of view of the barcode reader.

23. The barcode reader of claim 22, wherein the executable instructions include internal memory address references, including a start of execution address, configured such that the executable instructions will execute when loaded to physical memory at physical memory addresses which align with the internal memory address references, the start of execution address corresponding to a predetermined address at which a processor in the barcode reader is preconfigured to begin execution of the executable instructions.

24. The barcode reader of claim 22, wherein the executable instructions include:

internal memory address references configured such that the executable instructions will execute when loaded to physical memory at physical memory addresses which align with the internal memory address references; and a header including a physical memory address specification specifying the physical memory addresses which align with the internal memory references such that the barcode reader reads the physical memory address specification from the header and loads the executable instructions to physical memory addresses which align with the internal memory address references.

\* \* \* \* \*